United States Patent [19]

Norwood

[11] 4,345,145

[45] Aug. 17, 1982

[54] USER PROGRAMMABLE CONTROL SYSTEM FOR TOASTER OVEN APPLIANCE

[75] Inventor: Richard L. Norwood, Waterbury, Conn.

[73] Assignee: General Electric Company, New York, N.Y.

[21] Appl. No.: 151,535

[22] Filed: May 19, 1980

[51] Int. Cl.³ .............................................. H05B 1/02
[52] U.S. Cl. .................................. 219/492; 219/413; 219/408; 219/494; 219/506; 99/328; 99/329 R; 219/486; 364/189
[58] Field of Search ............... 219/243, 411, 408, 413, 219/491, 492, 493, 494, 497, 506, 486, 485, 483, 10.55 B, 10.55 M, 10.55 E; 99/327, 328, 329 R; 364/705, 107, 104; 236/46 D, 15 BG, 46 R, DIG. 8

[56] References Cited

U.S. PATENT DOCUMENTS

| | | | |
|---|---|---|---|
| 3,819,906 | 6/1974 | Gould, Jr. ........................... | 219/506 |
| 3,837,568 | 9/1974 | Goodhouse et al. ................ | 219/493 |
| 3,889,875 | 6/1975 | Goodhouse ......................... | 219/492 |
| 4,001,536 | 1/1977 | Eberhardt, Jr. ..................... | 219/492 |
| 4,011,428 | 3/1977 | Fosnough et al. .................. | 219/10.55 B |
| 4,056,699 | 11/1977 | Jordan ................................. | 219/10.55 B |
| 4,065,659 | 12/1977 | Yount et al. ........................ | 219/413 |
| 4,119,957 | 10/1978 | Sasaki et al. ....................... | 219/453 |
| 4,131,786 | 12/1978 | Cooper .............................. | 219/10.55 B |
| 4,133,995 | 1/1975 | Buck .................................. | 219/10.55 B |
| 4,158,759 | 6/1979 | Mason .............................. | 219/10.55 B |
| 4,162,381 | 7/1979 | Buck .................................. | 219/10.55 B |
| 4,166,137 | 8/1979 | Buck .................................. | 219/10.55 M |
| 4,171,382 | 10/1979 | Buck .................................. | 219/10.55 E |
| 4,193,049 | 3/1980 | Salem ................................ | 219/413 |
| 4,197,581 | 4/1980 | Watrous et al. .................... | 219/497 |
| 4,206,872 | 6/1980 | Levine ............................... | 219/492 |
| 4,225,776 | 9/1980 | Meisner ............................. | 219/492 |

FOREIGN PATENT DOCUMENTS

| | | | |
|---|---|---|---|
| 1060116 | 8/1979 | Canada ............................... | 219/492 |
| 2718726 | 11/1978 | Fed. Rep. of Germany ...... | 219/497 |
| 2823058 | 12/1978 | Fed. Rep. of Germany ...... | 219/497 |

OTHER PUBLICATIONS

"Microprocessor Rules the Roast", Inspec. Electronics, pp. 105–110, 12/1976, vol. 49, #25.
Appliance Manufacturer (p. 33), 7/1975.
Electronics (p. 91), 4-14-1976.
Texas Instruments Bulletin Cl-304, 1978.

*Primary Examiner*—M. H. Paschall
*Attorney, Agent, or Firm*—Leonard J. Platt; George R. Powers; Carlos Nieves

[57] ABSTRACT

A toaster-oven appliance has a control circuit which enables a user to program the operation of the appliance through a keyboard with audible feedback and which includes functional keys for selecting one mode of operation from available BAKE, BROIL, SLOW COOK, TIMER and TOAST modes, and numerical keys for entering a temperature, time interval and toast color. The BAKE and BROIL functions may be used with the TIMER function to provide TIME-BAKE and TIME-BROIL functions. An interactive digital display is provided to display a user selected function, temperature, time interval, or an error indication in the event that an impermissible entry is made. In the presently preferred embodiment that is described, the control circuit includes microprocessor-based programmable digital logic. The microprocessor operates under the direction of a master program. The control circuit, under the direction of the microprocessor, periodically checks the control signals and the operation of the appliance to establish that operation is normal. Information stored in the memory of the microprocessor is periodically updated. An audible signal is generated when the timer time interval has expired, when the selected temperature has been reached in the BAKE mode and when a number of alarm conditions occur. The digital logic together with a digital-to-analog converter provides enhanced temperature control and repeatability.

28 Claims, 35 Drawing Figures

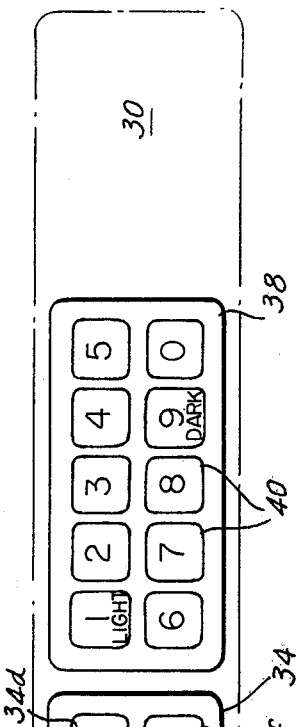
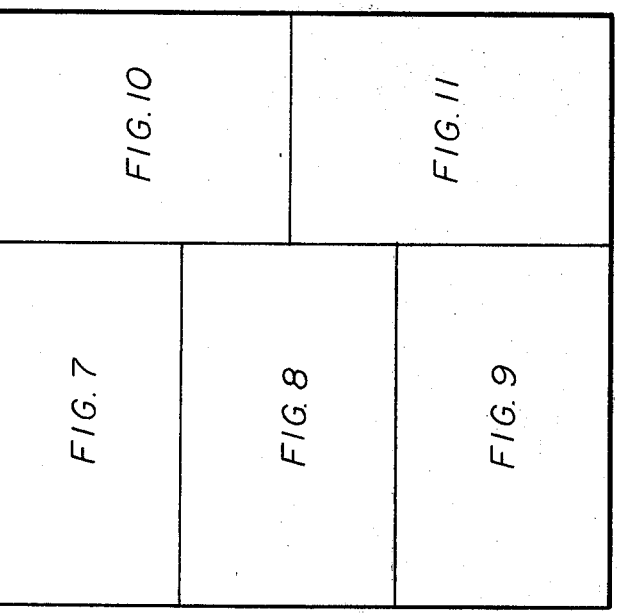
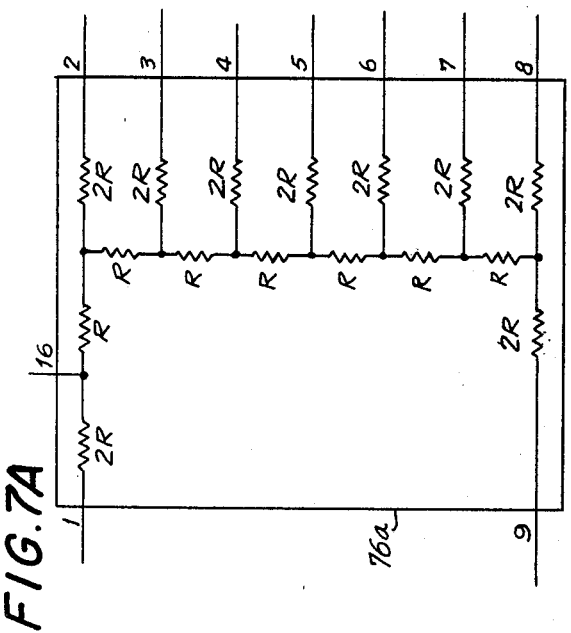
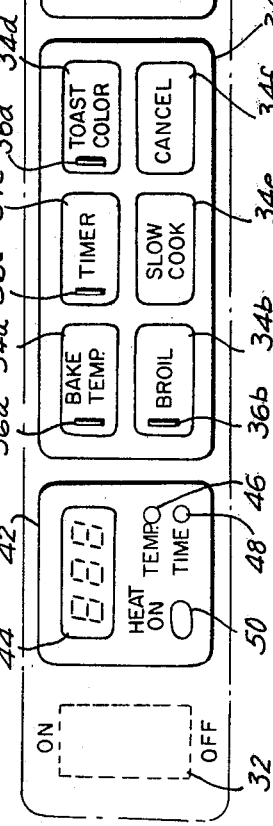

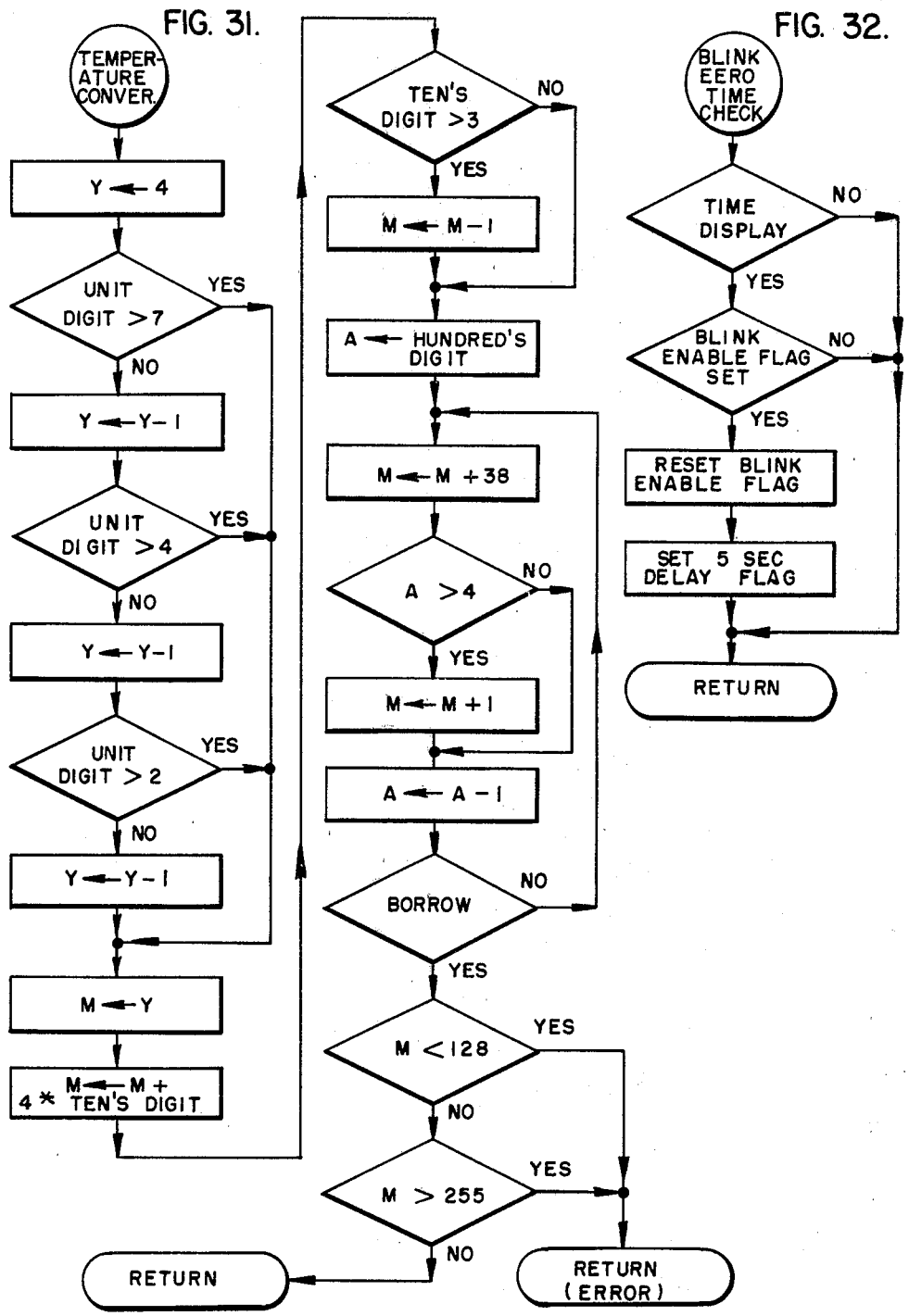

USER PROGRAMMABLE CONTROL SYSTEM FOR TOASTER OVEN APPLIANCE

BACKGROUND OF THE INVENTION

This invention relates to toaster oven appliances and, in particular, to an interactive user programmable control circuit for controlling and operating a toaster oven appliance and for providing improved accuracy and performance repeatability thereof.

Toaster oven appliances have by their nature been small appliances which have used simple electrical components to provide function and temperature control. Temperature sensing within the food chamber or compartment is typically by means of temperature varying resistance elements such as thermistors. Temperature selection is typically provided by means of a potentiometer which is adjustable by the user to a selected temperature by means of a calibrated scale. Function selection is normally provided by a multi-pole, multi-throw rotary switch which establishes a required electrical connection of discrete elements for each of the available modes of operation. The modes of operation commonly provided on contemporary toaster ovens include BAKE, BROIL and TOAST. Some of the more recent toaster-oven designs include a TIMER function which can be combined with the standard functions or modes to provide the functions of TIME BAKE and TIME BROIL. Adjustment of the timer function has also been by means of a calibrated potentiometer which can adjust a time constant in a relaxation or regenerative oscillator or set a mechanical timer.

The known toaster-oven appliances have, therefore, generally used analog control circuits. However, such circuits do not provide a great degree of accuracy or repeatability since they rely on user adjustments of continuously variable components such as potentiometers and, to some extent, on the regulation of the power supply and the voltage levels in the control circuit.

A toaster oven manufactured by the assignee of the present invention, and designated as Model No. 2000, features a source of stable reference voltages which are applied to the adjustable timer and temperature potentiometers. The use of accurate reference voltages eliminates one of the causes of inaccuracy and lack of repeatability.

The Model No. 2000 toaster oven appliance also includes circuitry for comparing a temperature sense voltage with voltage signals which are derived by the use of predetermined relationships which are a function of the selected mode of operation and the user selected temperature. While the Model No. 2000 represents an advance in toaster oven technology, it fails to provide the accuracy and repeatability and, therefore, the predictability in the use of toaster oven appliances. Additionally, the Model No. 2000, as the other known toaster oven appliances, fail to provide an interactive display which assists the user in making proper data entries, and which displays data such as the selected mode of operation, the selected temperature and the time remaining in a timed mode of operation.

In larger microwave ovens, microprocessor-based logic circuitry has in recent years been displacing electro-mechanical timers and other control elements. Microprocessor-based control circuits for microwave ovens are disclosed in U.S. Pat. No. 4,011,428; "Amana's Oven With a Brain", *Appliance Manufacturer*, Page 33, July 1975; "LSI Controls Gaining In Home Appliances", *Electronics,* page 91, Apr. 14, 1977; "Single-Chip Microprocessor Rules the Roast", *Electronics,* page 105, Dec. 9, 1976. A preprogrammed microwave oven controller is offered by Texas Instruments and designated by its product number TMS 1117, and described in "TMS 1000 Series One-Chip Microprocessors From Texas Instruments", Bulletin Cl-304, 1978.

The microwave oven control circuits offer programmable sequences of cooking cycles, temperature control cooking as well as cooking speeds. However, microwave ovens do not use the same heating and sensing elements found in toaster ovens. Additionally, the modes of operation are normally different in the two appliances although in some instances there is some overlap. Because of their greater size, microwave ovens have been used to prepare small as well as larger meals, while toaster ovens have traditionally been used to make toast, and bake, broil or cook small meals. Thus, while manufacturers have commenced to use microprocessor-based circuitry in the large and more expensive appliances, it is not until now that a microprocessor-based control circuit specifically adapted for toaster ovens has been developed.

SUMMARY OF THE INVENTION

In order to overcome the disadvantages and inherent limitations of prior art toaster oven appliances, it is an object of the present invention to incorporate digital logic control for a toaster-oven appliance.

It is another object of the invention to provide a control system for toaster oven appliances which allows the user to program information into the control for a number of different modes of operation and operating conditions.

It is still another object of the invention to provide a control system for toaster oven appliances which includes interactive data entry circuitry which assists and guides the user in making proper data entries.

It is yet another object of the invention to provide a control system for toaster oven appliances which includes a keyboard for data entries and a display for informing the user of selected operating parameters in the oven.

It is a further object of the invention to provide a control system for toaster oven appliances which significantly enhances the accuracy and performance repeatability over comparable prior art appliances.

It is still a further object of the invention to provide a control system for toaster oven appliances which is implemented with a programmed micro-processor.

It is yet a further object of the invention to provide a control system for toaster oven appliances which monitors critical operating parameters during operation to detect abnormal or hazardous conditions and which takes corrective action as well as provides audible and visible indications.

It is an additional object of the invention to provide a new and improved toaster oven appliance.

It is still an additional object of the invention to provide a toaster oven appliance which is simple in construction and convenient to use.

It is yet an additional object of the invention to provide a toaster oven appliance which has numerous capabilities and great versatility but yet may be of relatively simple and inexpensive construction.

In order to achieve the above objects, as well as others which will become apparent hereafter, the toaster oven appliance in accordance with the broader aspects of the invention includes heating elements for heating the oven cavity or compartment and sensing elements for sensing the temperature within said compartment. A keyboard is provided having a plurality of user actuatable keys including a plurality of numeric and function entry keys for entering numerical and functional data and for selecting one of a plurality of modes of operation. Display means is provided for displaying numerical and functional operating data. Heater control means is provided which controls said heating elements. Function selection means is connected to said keyboard for establishing a set of control parameters for each selected mode of operation. There is also provided heat requirement-determining means connected to said heating means and to said function selection means for determining the heat input requirements into said compartment to satisfy predetermined relationships for each selected mode of operation and for controlling said heater control means as a function of the actual temperature in said compartment and the temperature and mode of operation selected on said keyboard.

According to a presently preferred embodiment, programmed processor means is utilized which is responsive to said keyboard and to said sensing means for controlling said heating elements as a function of the user-selected mode of operation and for applying selected data to said electronic display means.

BRIEF DESCRIPTION OF THE DRAWINGS

The foregoing and other objects and features and advantages of the present invention will become clearer from the following detailed description of illustrative embodiments of the present invention, taken in conjunction with the accompanying drawings, in which:

FIG. 2 is an enlarged top plan view of the keyboard panel shown in FIG. 1;

FIG. 6 is a figure map showing how the schematic diagrams of FIGS. 7-11 fit together to form an overall electrical schematic of the presently preferred embodiment;

FIG. 7A shows the details of the ladder resistor network shown in FIG. 7.

FIGS. 13-34 show in detail the various subroutine parts of the general sequence of operation shown in FIG. 12.

DESCRIPTION OF THE PREFERRED EMBODIMENTS

I. OVERVIEW (FIGS. 1 and 2)

The invention, broadly speaking, is directed to a toaster oven appliance and a control circuit therefor which enables a user to program the operation of the appliance through a keyboard which includes both functional keys for selecting a desired mode of operation, such as BAKE, BROIL, SLOW COOK, TIMER and TOAST, and numerical keys for entering desired temperatures of operation, cooking time intervals and toast color. To facilitate convenient and trouble-free operation, there is provided an interactive digital display which displays user selected input data as well as guides the user in making proper entries. Error indications are provided on the display in the event that an impermissible entry is made. While many of the objects of the present invention can be achieved with discrete circuitry, the presently preferred embodiment includes microprocessor-based programmable digital logic. This not only substantially decreases the cost of the toaster oven appliance but substantially enhances its capabilities and versatility. The control circuit, under the direction of the programmed microprocessor, carries out various routines and sub-routines during operation. Not only are these routines and sub-routines utilized to effect proper operation of the toaster oven appliance, but the control circuit also periodically checks the various control signals at preselected monitoring points, as well as the operation of the appliance, to establish that operation is normal. Any failure or abnormality in the device results in suitable commands to the appliance which normally terminates the operation thereof, as well as provides visual and audible alarm signals for the benefit of the user. The control circuit in accordance with the present invention provides significantly enhanced temperature control and repeatability and accuracy of temperature selection as compared to what was available in prior art toaster oven appliances.

Figure 1:
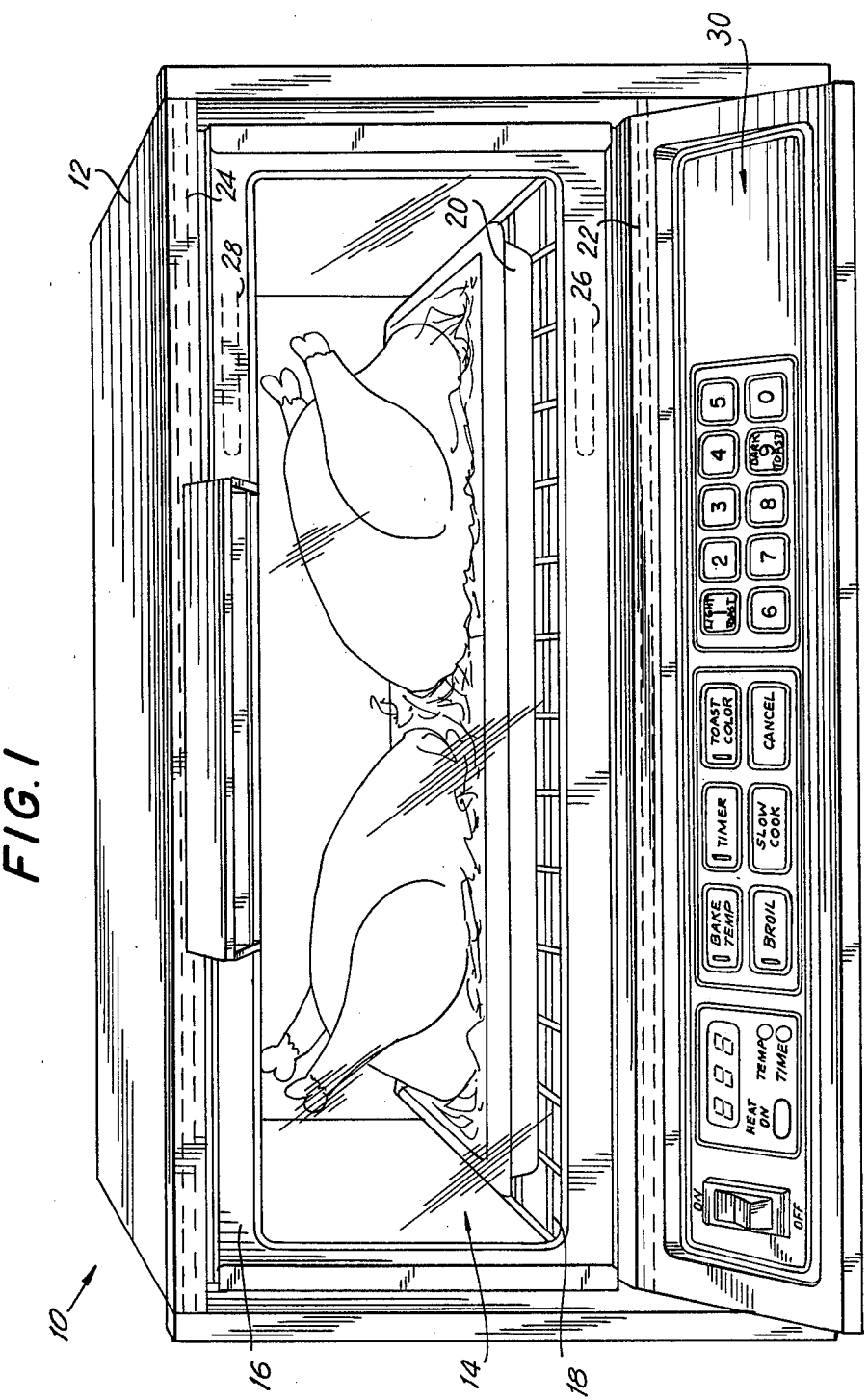
FIG. 1 is a perspective view of the toaster oven appliance in accordance with the present invention, illustrating the keyboard panel which includes function and numeric entry keys as well as visual displays.

Referring now specifically to the figures, wherein similar parts are designated by the same reference numerals throughout, and first referring to FIG. 1, the toaster oven appliance in accordance with the present invention is generally designated by the reference numeral 10. The appliance 10 includes a housing 12 which may be of conventional construction having an oven cavity or food compartment 14 which is accessible through a suitably hinged door 16 which is normally hinged at the bottom thereof so as to swing downwardly.

Inside the oven cavity 14 there is provided a rack or support wires 18 which are adapted to support a tray 20 or other food container on which the food as well as slices of bread to be toasted are placed.

Shown in dashed outline in FIG. 1 are lower and upper heating elements 22 and 24, respectively, as well as lower and upper sensing elements 26 and 28, respectively. The heating elements 22, 24 may be in the nature of rod heaters which are conventionally used in toaster oven appliances. The sensing elements 26 and 28 are advantageously of the type which provide rapid thermal response, significant resistance variation as a function of temperature, and good mechanical strength. Such sensing elements are described in U.S. Pat. No. 4,135,179, issued on Jan. 16, 1979, and assigned to the assignee of the present application. The operation of the sensing elements and heating elements will be more fully described hereafter in connection with FIGS. 3, 8 and 9.

Still referring to FIG. 1, an important feature of the present invention is that the appliance 10 is provided with a keyboard panel 30 which is shown in greater detail in FIG. 2. The panel 30 includes an on/off switch 32 which is the master power switch for the appliance. The keyboard panel 30 also includes a plurality of user actuatable keys. Thus, there is provided a function select section 34 which includes the following function keys: BAKE TEMP 34a, BROIL 34b, TIMER 34c, TOAST COLOR 34d, SLOW COOK 34e and CANCEL 34f. Also provided are function LEDs to inform the user of the function or mode in which the appliance is operating. Thus, function LEDs 36a, 36b, 36c and 36d are provided for the BAKE TEMP, BROIL, TIMER and TOAST color functions respectively.

The numeric input section 38 includes number entry keys 40. As will be noted, keys for numeric digits 0-9 are provided. Additionally, as will be more fully described hereafter, the numeric keys 40 for the digits 1-9 also serve to select toast color, with the numeric key for the digit 1 serving to select a light toast color, the numeric key for the digit 5 to select medium toast color, and the numeric key for the digit 9 to select dark toast color. The toast colors, however, may be selected in small incremental steps from light to dark by selection of increasingly higher digits from the digits 1 through 9.

Also provided on the keyboard panel 30 is a display section 42 which includes a three-digit, seven-segment display 44 which displays either one, two or three numeric digits or alphanumeric characters. When numerical digits are displayed, these can represent either a selected temperature or time interval. When alphanumeric characters are shown, these can represent either a mode of operation of the device or can indicate that an error was made in the entry of data or that there is a malfunction in the unit.

The display section 42 also indicates a display function LED 46 which designates, when lit, that numeric data displayed on the display 44 represents a temperature. Similarly, when a function LED 48 is lit, this designates that the numeric data shown in the display 44 represents a time parameter. The display section 42 also includes a light 50 which is turned on whenever the upper heating element 24 is energized and, therefore, the oven cavity 14 is being heated.

The keyboard panel 30, and particularly that portion thereof which includes the user function and numeric keys, is advantageously in the nature of a membrane keyboard with audible feedback. By making the display interactive and providing the function and display indicator LEDs, the appliance is simple and convenient to operate. Additionally, the appliance is extremely flexible in that it permits the user to enter numeric and function data in a number of different sequences, and both the BAKE and BROIL functions may be combined with the TIMER function so as to provide timed BAKE and BROIL functions. Further, once the toaster-oven has been programmed by the user, it can easily be reprogrammed to correct or modify previous entries.

II. FUNCTIONAL BLOCK DIAGRAM
(FIGS. 3 and 4)

Figure 3:
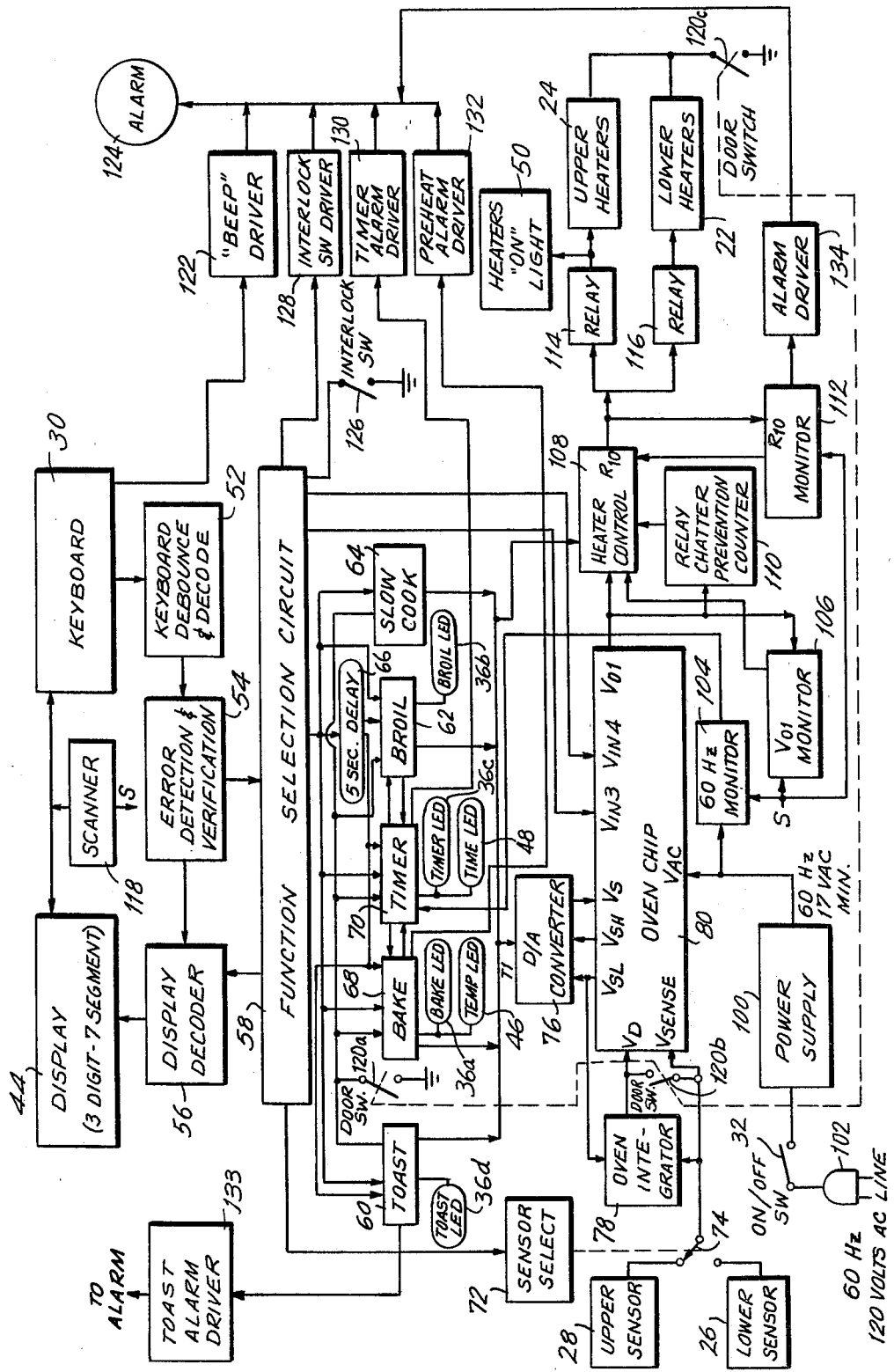
FIG. 3 is a block diagram, primarily functional, illustrating one embodiment for carrying out important features of the present invention.
Figure 4:
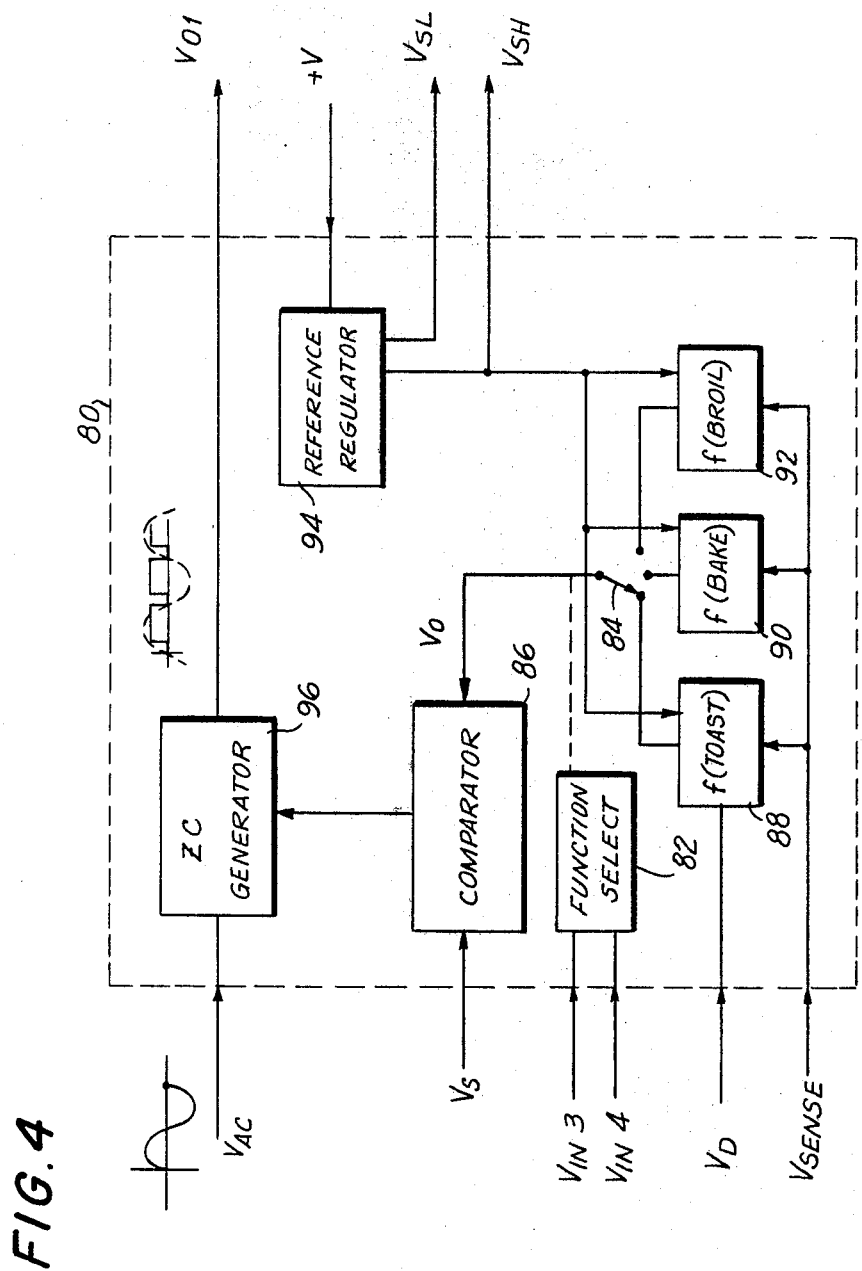
FIG. 4 is a functional block diagram of the oven chip shown in FIG. 3.

Referring to FIG. 3, there is shown a functional block diagram of a control circuit for a toaster oven appliance in accordance with the present invention using discrete or hybrid circuitry instead of a programmed processor. As will become evident from the description that follows, the discrete circuit approach suggested in FIG. 3 is not as versatile and does not have all the capabilities of the microprocessor-based presently preferred embodiment which is described with reference to FIGS. 5-11. However, a discussion of FIG. 3 is included to assist in an understanding of the features and operation of the invention and to suggest that important although limited features of the present invention can be achieved with discrete or hybrid circuitry instead of preferred microprocessor-based circuitry. Each of the blocks shown in FIG. 3 represents a circuit or system which is well known to those skilled in the art or which would be obvious to such person. Where the discrete circuit for a particular block may not be readily evident, this will be noted in the following discussion.

In FIG. 3, the keyboard 30 is shown connected to a keyboard debounce and decode circuit 52. As will be described below, the keyboard 30 is scanned periodically to detect user activation of one of the function or numeric keys. In order to make the device more immune to noise (RFI, EMI line transients, etc.), the keyboard debounce and decode circuit "looks" at the keyboard 30 approximately two times or cycles to confirm that a certain user key has been actuated. The debounce circuit 52 will, therefore, only transmit function or numeric data to the error detection and verification circuit 54 when an actuation of a function user key has been confirmed. If a user function or numeric key appears actuated for less than the required number of cycles or testing periods, the false signal is discounted.

The error detection and verification circuit 54 serves to examine the data which has been entered by the user, including function and numeric data, and determines whether the entries are proper. The circuit 54 may be in the nature of a sequential decoding logic circuit suitably programmed. The output of the error detection and verification circuit 54 is transmitted to a display decoder which decodes the information so that it can be shown on the display 44. Such information includes numeric temperature and timed period information, alphanumeric function statements as well as alphanumeric representations indicating erroneous entries and malfunctions in the unit.

The keyboard 30 and the associated circuits advantageously provide for a blinking "0" whenever a numerical digit must be entered. Thus, a blinking "0" appears when the TIMER key is depressed to notify the user that at least one digit must be entered for the TIMER function. Similarly, when the BAKE key is depressed, a blinking "0" appears to suggest that numeric temperature digits be entered. However, as will be more fully described below, once a first temperature digit is selected, two additional digits must be selected within predetermined time periods or an error indication "Err" will appear since the only permissible BAKE temperatures are between 185° F. and 517° F. When the TOAST key is depressed the blinking "0" appears to instruct the user to select a TOAST color key from 1 through 9 (corresponding to toast colors from light toast to dark toast).

Once the error detection or verification circuit 54 determines that a proper function entry has been made, it commands a function selection circuit 58 to actuate one of the function mode controls. The function selection circuit 58 may be, for example, in the nature of a multiple pole, multiple electronic or electromechanical switch. Thus, if the TOAST function has been selected, the TOAST control circuit 60 is enabled to control the operation of the toaster appliance. When so enabled, the toast LED 36d is lit so that the same is visible on the keyboard panel 30. Similarly, when the BROIL function is selected, the BROIL control circuit 62 is enabled and the BROIL LED 36b is lit. At this time, the BROIL control circuit 62 controls the operation of the appliance. Similarly, selection of the SLOW COOK function actuates the SLOW COOK control circuit 64 which, then, controls the appliance. However, as will be more fully described hereafter, the seven segment display 44 is not used to display any data in the SLOW COOK mode. Accordingly, the display 44 can be used to display alphanumeric characters to indicate that the appliance is in the SLOW COOK mode. In the presently preferred embodiment, the display 44 illustrates the alphanumeric characters "SLO", and said characters reamin lit throughout the SLOW COOK mode operation. For this reason, there is no need to provide a separate SLOW COOK function LED associated with the SLOW COOK function key 34e as with the other functions which are provided with separate function LEDs.

In the presently preferred embodiment, the BROIL function is preprogrammed, so that as soon as the BROIL function key 34b is depressed, the appliance goes into the BROIL mode, the display 44 indicates "brL" and the heaters are immediately energized as will be more fully described below. No further entries need be made for the BROIL function.

Similarly, the SLOW COOK function is preprogrammed. While the specific parameters can be modified, the appliance of the presently preferred embodiment is preprogrammed to heat the oven cavity at 425° F. for one hour and then 225° F. indefinitely until the door 16 is opened. Accordingly, when the SLOW COOK function key 34e is depressed, the appliance enters its preprogrammed routine, the display 44 indicates "SLO" and no further user input is required.

With respect to the TOAST function, depression of the TOAST function key 34d does not immediately activate the appliance. Before the TOAST operation can proceed, one of the nine numeric keys 40 must be depressed to select a TOAST color which, when selected, starts the operation of the appliance immediately. The TOAST LED 36d lights as soon as the TOAST key 34d is depressed. At the end of toasting, the oven will provide an audible alarm. If the selected TOAST color is too light, a new color can be programmed before the toast alarm is sounded but only after the door is opened, or after either the TOAST or CANCEL and TOAST keys are depressed. However, once the toast color has been reached and the TOAST alarm has issued, a new toast color can only be programmed after either the door is opened and closed or the CANCEL key is depressed.

In certain modes of operation, the heater elements 22, 24 are turned on as soon as a function key is depressed. In other cases, the control circuit waits until complete and proper data is entered or until the user is permitted to change or correct prior entries or instructions. As will be more fully described below, certain functions require operating temperatures within predetermined temperature ranges and selection of a temperature outside that range requires correction. Additionally, for example, if a function is to be timed, sufficient time must be allowed to the user to enter the appropriate time period data before the appliance commences its mode of operation. Therefore, in order to provide the user sufficient time in which to enter the necessary data or correct or change the data already entered, there is advantageously provided a delay circuit 66. Thus, the delay circuit 66 is shown in FIG. 3 to be connected to the TOAST, BROIL, BAKE and TIMER circuits 60, 62, 68 and 70 respectively.

When the appliance 10 is used simply as a timer, the TIMER function key is depressed, and the 5-second delay circuit 55 provides a 5-second delay for new entries. The first entry provides a digit in the minute position. If a second digit is entered within the 5-second delay period, the second digit assumes the minute position while the first entered digit assumes the ten-minute position. Likewise, if a third digit is entered within five seconds of the entry of the second digit, the first two digits are shifted in the display 44 and the last entered digit determines the minute units; the second entered digit determines the ten-minute unit; and the first entered digit determines the hundred-minute unit. The TIMER is adapted to time periods up to 999 minutes. The TIMER does not decrement during the five-second delays that the circuit waits for the entry of a further digit. Of course, upon entry of a third time digit the system does not anticipate further entry of time digits and the TIMER immediately starts to count down upon entry of the third digit. However, as soon as a five-second delay elapses without entry of a further digit or as soon as the maximum three digits are entered, the TIMER immediately starts to decrement or count down the time. Where a previous number or time interval has been entered, and the TIMER function key is inadvertently pressed, the TIMER will wait five seconds and, if no new entries are made, the TIMER will count down the earlier entered or programmed time period. This avoids loss of time entries by inadvertent pressure applied to the TIMER key. If, on the other hand, no earlier time entries were made, depressing the TIMER key will result in a blinking zero on the display 44 to instruct the user to make a time entry. Where, however, a new entry is made after the TIMER key is depressed, the device is programmed for the new time period and the earlier period is ignored since new time entries evidence an intent to erase the earlier entry or change the same.

The delay circuit 66 is also used to advantage in the BAKE mode of operation. As will be described more fully hereafter, the appliance is programmed to permit the selection of BAKE temperatures in the range of 185°-517° F. Since each of these temperatures includes three numeric digits, the heater elements 22, 24 are turned on as soon as the third temperature digit is entered. If the second and third temperature digits are not entered within five seconds of the entry of the next previous digit entry, the display 44 will indicate "Err" to designate an error condition. To correct the error a proper three digit temperature entry must be made. Three new digits may be entered for temperature. If the BAKE key is depressed in this error condition, the previously entered digits prior to the error indication are returned to the display so that the user may now complete the required three-digit temperature input. Proper temperatures (between 185° F. and 517° F.) can be programmed after either the CANCEL and BAKE or BAKE keys are depressed or the desired digits are simply entered.

In the TIME BAKE mode, the display 44 shows the temperature for five seconds after the temperature is entered or after the temperature is displayed upon actuation of the BAKE key. At such time, the temperature LED 46 goes off and the TIME LED lights up to indicate that the display 44 now displays TIME. Therefore, whenever the temperature is displayed in the TIME BAKE mode, the display reverts to TIMER display after a five-second delay if no changes are made to the temperature within the five-second delay period. The user can change the temperature during that five-second delay period. As soon as the BAKE key is depressed and a new temperature digit is entered, the heater rods are turned off until three temperature digits are entered and, subsequently, are immediately turned on. If less than three temperature digits are entered, an error indication will appear in the display 44 as above described. While the temperature is displayed, the counter does not decrement.

In programming TIME BAKE, time or temperature may be entered first. However, if a recipe requires a preheated oven, it may be advisable to program the temperature first by simply pressing the BAKE key and waiting for the oven to reach the desired temperature, as evidenced by a pre-heat beep, before programming the baking TIME.

When the TIME BROIL function is selected, the display 44 indicates the notation "brL" for five seconds upon depression of the BROIL function key 34b, and, following the five-second delay, the display 44 reverts to TIME display. When the BROIL key is depressed during operation, the display will indicate "brL" for five seconds after which time the display will revert to show the time remaining in the programmed cycle. The TIMER is inoperative during the display of "brL". As with the TIMER and TIME BAKE modes, the delay circuit 66 provides the user five seconds after the entry of each time digit to enter additional digits or modify the time originally selected. If no new digits are entered after the five-second delay, the timer 70 begins to count down.

When the door 16 is opened to check food while cooking, the TIMER will stop counting and the heating elements will be shut off. When the door is closed, the TIMER, in a timed mode, will continue to count-down and cooking will continue. Only in the TOAST mode will opening of the door clear the system and require reprogramming.

When any timed function or TOAST is completed, the oven will sound continuous beeps (approximately 3 KHz at ⅛ second on and ⅝ second off). Only in TIME BAKE when the selected temperature is reached will a preheat audible signal one second long be generated.

The function mode control circuits 60, 62, 64 and 68 are, in the embodiment being described, digital circuits which convert user selected input temperature data, user selected input toast color data, and preprogrammed data for BROIL and SLOW COOK modes to generate desired temperature information T1 which represents the user selected temperature or the temperature required to provide a selected toast color or a temperature which has been preselected for a preprogrammed mode of operation. The required appliance temperature is shown in FIG. 3 by the designation T1 at the input to a digital-analog (D/A) converter 76. When the desired temperature T1 signals are in digital form, as they are in the embodiment being described, the D/A converter 76 converts the T1 signal into a temperature set point or trip analog voltage $V_S$ in accordance with the following relationship:

$$V_S = V_{SL} + (T_1 - 185° F.)0.0081 \text{ (Volts/F°)}$$

where
$T_1$ = desired temperature
$V_{SL}$ = a low reference voltage (to be determined)
and $T_1$ = desired temperature.

An oven integrator circuit 78 is provided to produce consistent toast color independent of toast compartment temperature at the initiation of each toasting operation, the condition of the bread to be toasted and bread loading. The integrator circuit 78 will be briefly described hereafter. However, a complete explanation of the integrator circuit used in conjunction with the TOAST mode of operation is fully described in U.S. patent appln. Ser. No. 6/095867 filed Nov. 19, 1979 (6HW-5091-A) for "ELECTRICAL TEMPERATURE SENSING SYSTEM FOR TOASTER APPLIANCES" which is assigned to the assignee of the present application. However, in FIG. 3, the integrator circuit 78 is shown to have two inputs and one output. One of the inputs for the integrator 78 is $V_{SENSE}$ from one of the sensors 26, 28, and another input is a voltage $V_{SL}$, to be more fully described hereafter, from the oven chip 80. The integrator 78 uses the two voltages $V_{SENSE}$ and $V_{SL}$ to generate a difference or integrator output voltage $V_D$.

The oven chip 80 is advantageously in the form of an integrated circuit. FIG. 4 is a functional block diagram of the oven chip 80 and illustrates one possible circuit arrangement which can be synthesized from discrete or hybrid circuitry and can determine the heat requirements of the oven appliance and control the heaters accordingly.

In FIG. 4, the oven chip 80 is shown to include a function selector circuit 82 which includes two inputs, $V_{IN3}$ and $V_{IN4}$, which are derived from the function selection circuit 58 and are functions of the selected mode of operation. The function select circuit 82 controls a single pole switch 84 which is adapted to connect the input of a comparator 86 to one of the transfer function generating circuits 88, 90 or 92. The TOAST transfer function generating circuit 88 has two voltage inputs, namely $V_D$ and $V_{SENSE}$. When the comparator 86 is connected to the TOAST circuit 88, the voltage $V_o$ to the comparator is equal to the following transfer equations:

$$V_o = 22.59(V_{sense} - 0.5126 V_D - 0.124 V_{SH})$$

where $V_o$ is the input to the internal comparator 86 whose trip voltage is $V_S$, where $V_{SH}$ is an upper or high reference voltage generated by the reference regulator 94.

In the BAKE mode of operation, the comparator 86 is connected to the BAKE circuit 90 and the voltage $V_o$ applied to the comparator is a function of the following transfer equation:

$$V_o = 8.333(V_{sense} - 0.195 V_{SH})$$

Similarly, in the BROIL mode of operation, when the comparator 86 is connected to the BROIL circuit 92, the voltage $V_o$ to the comparator is defined by the following transfer function:

$$V_o = 10.94(V_{sense} - 0.15 V_{SH}).$$

Thus, it is noted that all three transfer equations for $V_o$ are a function of the sensor 26, 28 signals and, therefore, a function of the actual temperature in the oven cavity 14. The voltages $V_o$ are also a function of the constant upper reference voltage $V_{SH}$. It is only the transfer equation for the TOAST function that is additionally a function of the difference or integrator voltage $V_D$. Of course, the coefficients of the various voltages in the above equations are different, the coefficients having been determined to provide suitable input voltages to the comparator 86 for comparison with the trip voltages $V_S$ which are, as described, a function of the desired oven cavity temperatures $T_1$.

When the comparator input voltage $V_o$ is below the trip voltage or temperature set point $V_S$ the comparator 86 enables a zero-crossing (ZC) generator 96 which provides zero-crossing gate pulses $V_{O1}$ during any interval requiring or demanding heat. Referring to FIGS. 3 and 4, the ZC generator 96 obtains an AC signal $V_{AC}$ from power supply 100 which is connected to the power lines via the plug 102 through on/off switch 32. The sinusoidal voltage $V_{AC}$ is, through means well known in the art, converted to a series of pulses whenever the ZC generator 96 is enabled.

The power line voltage $V_{AC}$ is also applied to a 60 Hz monitor 104 which monitors the presence of an AC 60 Hz signal and feeds such signal to the timer circuit 70 where it serves as a time base for the timer so that no additional time base, clock or oscillator is required.

The ZC pulses $V_{O1}$ are applied to a heater control circuit 108 and to a relay chatter prevention counter 110. The heater control circuit 108 is connected to the outputs of the various function control circuits 60, 62, 64 and 68, as well as to the ZC output of the oven chip 80 at which the ZC pulses are provided when there is a requirement for heat within the oven compartment 14. The heater control 108 has an output designated as $R_{10}$ which provides the control voltage to the heater relays 114 and 116 in the heat demand condition. When the relays 114, 116 are actuated, the heaters 22, 24 are energized.

The relay chatter prevention counter samples the ZC pulses $V_{O1}$ and enables or disables the heater control 108. When the oven chip 80 determines that additional heat is needed from a no-heat required condition, as noted, ZC pulses will appear at the $V_{O1}$ output of the oven chip. Similarly, when the requirement for additional heat ceases, ZC pulses $V_{O1}$ likewise cease to appear at the output of the oven chip 80. In order to eliminate relay chatter from the occasional appearance or disappearance of one or several ZC pulses, the relay chatter prevention counter is adapted to enable the heater control 108 only upon the appearance or disappearance of ZC pulses for more than a minimum period of time. Thus, when the oven is on and cycling, such as in BAKE, the relays must be kept on for a minimum of one second or kept off for a minimum of one second before the heater control 108 is enabled to thereby apply power or remove power from the relays 114, 116. This avoids chatter of the relays which would take place if they were activated upon an occasional appearance of a ZC pulse and deactivated upon the occasional disappearance of a ZC pulse.

The $R_{10}$ monitor 112 likewise samples the ZC pulses $V_{O1}$ at the output of the oven chip 80. Additionally, the $R_{10}$ monitor 112 monitors the output of the heater control 108 to determine whether the output of the heater control circuit 108 is consistent with the ZC pulses input thereto. Thus, as noted, a voltage at the output $R_{10}$ which energizes the relays should be present when ZC pulses $V_{O1}$ are present at the input to the heater control 108. However, when the ZC pulses disappear, the relay energizing voltage at $R_{10}$ should likewise disappear. The $R_{10}$ monitor 112 serves the function of supervising the inputs and outputs to the heater control 108 and to turn off the heater control 108 as well as provide suitable alarms, to be discussed, when the relays are energized when, in fact, they should not be.

Because of the substantial number of signals which must be sampled and monitored, there is advantageously provided a scanning circuit 118 which, in effect, multiplexes the various control signals. The scanner 118 scans the keyboard 30, the display 44, as well as the 60 Hz monitor 104, the $V_{O1}$ monitor 106, and the $R_{10}$ monitor 112. Thus, the oven includes circuitry for monitoring certain critical parameters and taking suitable corrective action in the event of abnormal operation or failure. Where the failure permits turn-off of the heating elements such elements are turned off. However, when the failure is heaters remaining on and it is not possible to turn them off, an audible alarm is sounded for some conditions to notify the user. The specific failure modes and the corrective actions taken are described in conjunction with the respective circuitry which creates or corrects the failure.

A multipole pole (120a, 120b and 120c) door switch 120 (FIG. 8) is shown which serves the dual function of providing safety in operation, as well as to reset certain modes of operation. If the door 16 is opened in any mode, except TOAST, door switches 120a, 120b and 120c will, through the appropriate function control circuit 60, 62, 64, 68 and 70, inhibit power to the heater elements and stop the timer. When the door is closed the oven will resume operation in the BAKE, BROIL and SLOW COOK modes. In the TOAST mode, the system clears when the door is opened and may be preprogrammed in the TOAST mode or any other mode. Additionally, the door switch 120b, when closed, causes $V_D$ to equal $V_{SENSE}$, thereby establishing a new initial point from which the integrator circuit 78 may generate a difference voltage $V_D$ in relation to $V_{SENSE}$ for a preselected toast color when reprogrammed for TOAST.

To provide an audible feedback when a function or numeric key has been depressed on the keyboard 30, there is provided a "beep" driver which, when actuated by the keyboard or related circuitry, causes an alarm circuit 124 to sound an audible alarm or tone. While not critical, the alarm circuit 124 issues a 3 KHz signal for approximately 30 msec. There may optionally be provided an interlock switch which is, for example, closed only when the toaster oven appliance back cover or panel is removed which exposes the oven cavity and heater elements to thereby result in a fire hazard. When such interlock switch 126 is actuated, it causes the function selection circuit 58 to activate an interlock switch driver 128 which sounds the audible alarm 123, turns the heaters off, clears the system and displays "ILL" until the rear door or cover is properly replaced. A suitable audible alarm signal has been determined to be a 3 KHz signal which has an on time of 0.125 sec. and an off time of 0.875 sec.

A TIMER alarm driver 130 is also provided for actuating the alarm 124 when the TIMER 70 has counted down the entire preselected time period either in the TIMER mode or in the TIME BAKE or TIME BROIL modes. The TIMER alarm signal has the same audible output as the interlock alarm described above and is issued when the TIMER has decremented to zero and when the selected TOAST color has been reached.

In the BAKE mode, the first transition of $V_{O1}$ missing ZC pulses is an indication that the oven is at the preselected BAKE temperature. It is desirable to have the system issue a short "beep" on the first cut-off of $V_{O1}$ to inform the user that his/her preheat cycle is complete. Provided for this purpose is the preheat alarm driver 132 which is connected to the BAKE control circuit 68. The "beep" signal issued when the preheat cycle is reached is approximately one second long at 3 KHz. However, the ZC $V_{O1}$ pulse transitions beyond the initial transition do not result in a "beep". The completion of the preheat cycle produces a "beep" sound independently of the starting oven temperature. Thus, for example, when the oven is at 400° F. and is set to 185° F., a preheat "beep" will be issued when the oven reaches the 185° F.

An alarm device driver 134 connects the R10 monitor 112 to the alarm 124 to issue an alarm when R10 fails and stays high in the absence of ZC pulses $V_{O1}$.

III. MICROPROCESSOR EMBODIMENT
(FIGS. 5-11)

(a) Control Circuit

While the functional block diagram shown in FIGS. 3 and 4 are helpful to describe some of the functions and operation of a toaster-oven appliance in accordance with the present invention, any discrete or hybrid circuit which includes all of the functional blocks shown in FIGS. 3 and 4 would be significantly complicated, expensive to manufacture, and would not provide the versatility and capabilities which are possible with the presently preferred embodiment which makes use of a programmed processor.

Figure 5:
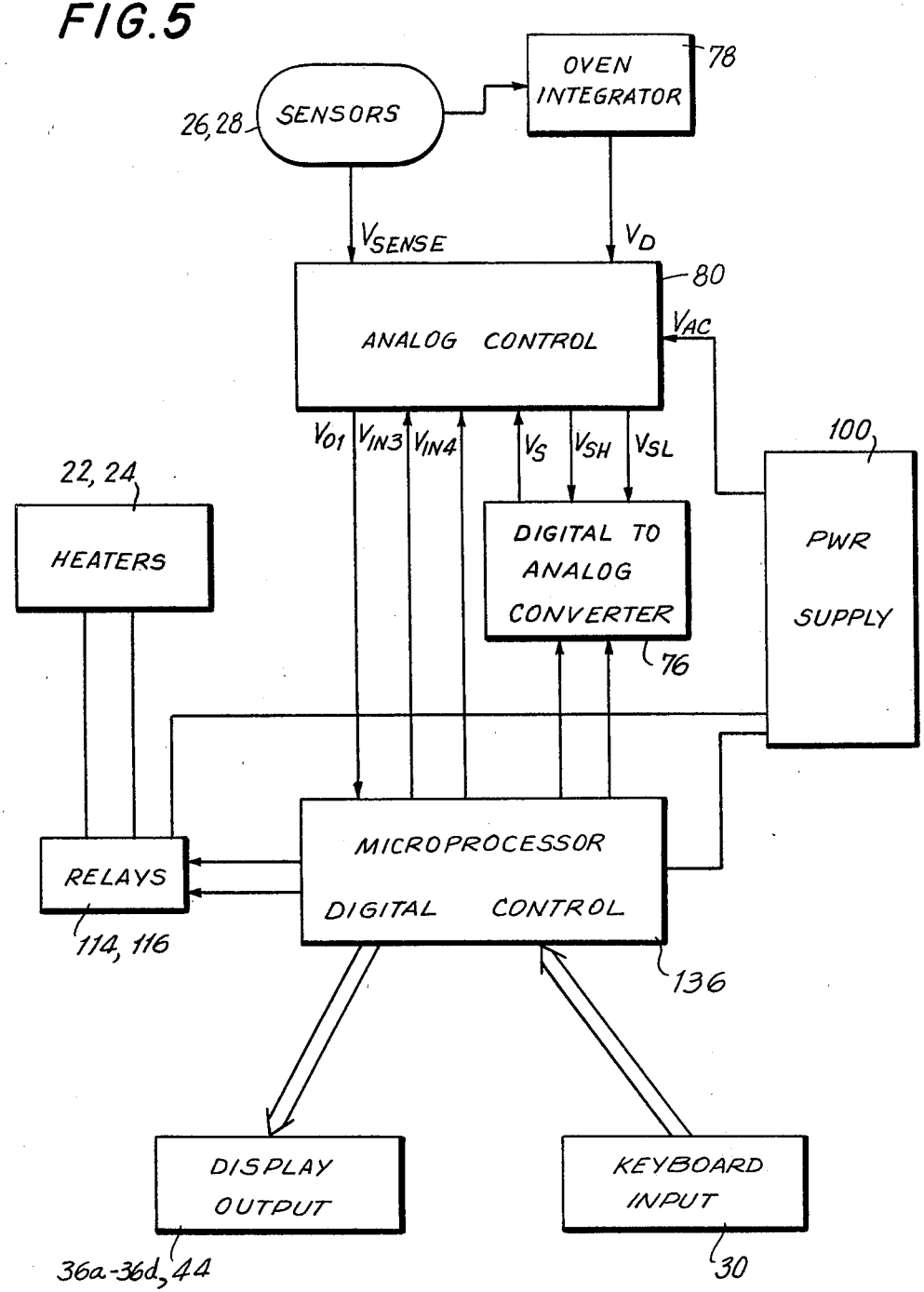
FIG. 5 is a functional block diagram of the presently preferred, microprocessor-based embodiment of the present invention.

In FIG. 5, a microprocessor 136 is shown in the environment of some of the same functional blocks and circuits described in connection wtih FIGS. 3 and 4. However, FIG. 5 is, of course, substantially simpler and less cumbersome and significantly less expensive. Additionally, the microprocessor embodiment of the invention shown in FIG. 5 not only performs all of the functions which are achievable with the discrete or hybrid circuit suggested in FIGS. 3 and 4 but provides additional functions and control features which will be described hereafter. As will be clear, the microprocessor 136 replaces the keyboard debounce circuit 52, the display decoder 56, the function selector 58, the function control circuits 60, 62, 64, 68 and 70, as well as all of the monitors, and alarm drivers.

FIG. 6 is helpful in orienting FIGS. 7-11 and for interfacing various other figures so that the entire schematic diagram of the presently preferred embodiment may be reconstructed.

Figure 7:
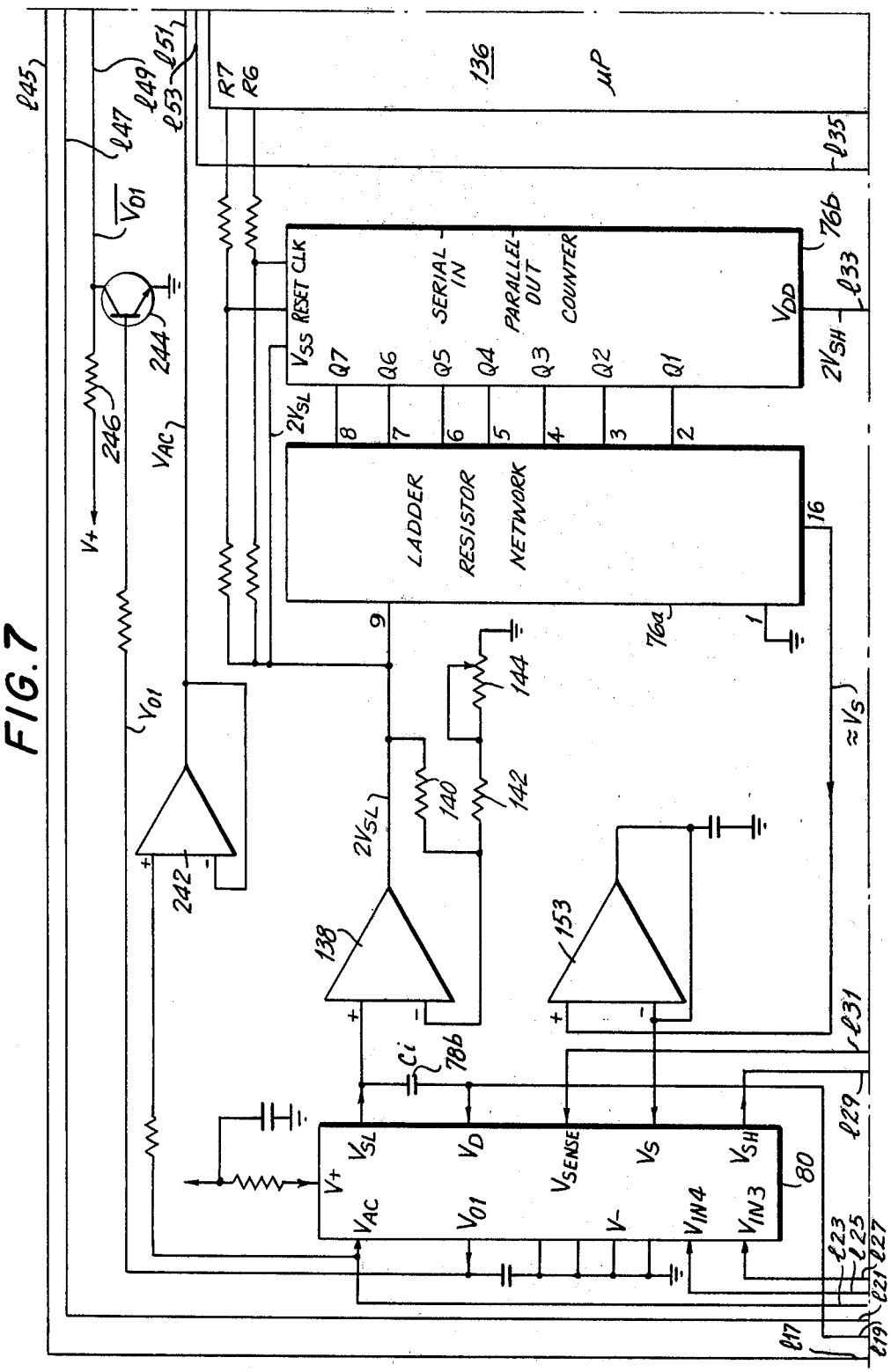
FIGS. 7 through 11 together form an electrical schematic of the presently preferred embodiment of the present invention when arranged in accordance with the figure map of FIG. 6.

Referring to FIG. 7, the presently preferred embodiment advantageously utilizes a microprocessor with a ROM, a RAM, and an arithmetic logic unit on a single semiconductor chip. As will be evident to those skilled in the art, there are numerous such microprocessors which are available and can be used for the purposes of the present invention, as will hereinafter become more apparent.

The presently preferred embodiment was constructed with and has provided satisfactory performance with the TMS 1100 microprocessor manufactured by Texas Instruments Inc. The TMS 1000 series chip is commercially available from Texas Instruments, Inc. and others. Technical details of the chip are available in a Texas Instruments, Inc. publication entitled "TMS 1000 Serias Data Manual", published in 1975. The TMS 1100 processor 136 has been customized by permanently configuring its read only memory (ROM) to implement the control schemes of the present invention and to carry out a set of predetermined instructions, as will be described more fully in connection with FIGS. 12-34. With the TMS 1100, the control circuit of the present invention can be realized at reduced costs, fewer parts and high reliability.

Generally, the TMS 1100 is a 4-bit microprocessor having 11 "R" individually addressed output latches and 8 bits of "O" parallel latched data outputs. The instruction read only memory (ROM) has 16 K-bits, being arranged in 2048×8 bits. The data random access memory (RAM) has 512 bits arranged in 128×4 bits. The 8 parallel "O" outputs are decoded in a programmable logic array (PLA) that is customized by changing the gate-level mask tooling during the production of the chips. The "R" outputs send status or enable signals to external devices and strobe the "O" outputs to displays. The same "R" outputs multiplex data into the "K" inputs. The "R" outputs usually multiplex inputs such as keys or a key and other data. Thus, multiple 4-bits words can be requested and stored with only one "R" output supplying the control signal.

Referring specifically to FIG. 7, the D/A converter 76 shown in FIG. 5 between the oven chip 80 and the microprocessor 136 will now be described in greater detail. An amplifier 138, together with resistors 140 and 142 and potentiometer 144, form a 2x or voltage doubler circuit which doubles the lower reference output voltage $V_{SL}$. The potentiometer 144 allows for accurate adjustment of the doubler to provide the desired multiplication factor. The doubled voltage $2V_{SL}$ is applied to an n-bit ladder resistor network and to a power supply input $V_{SS}$ of an n-bit serial-in, parallel-out storage counter.

Similarly, an amplifier 146 (FIG. 8) is provided which, with resistors 148 and 150 and potentiometer 152, forms a doubler for the upper reference voltage $V_{SH}$, the potentiometer 152 providing an adjustment for providing the desired multiplication factor. The doubled voltage at the output of the doubler 146 is applied to the high power supply voltage terminal $V_{DD}$.

Once a temperature data entry has been made or a toast color has been selected or a function has been selected which has been preprogrammed for a given temperature, the processor 136 is programmed to issue a specific number of pulses at the processor output R6 in accordance with Table 1 which shows the D/A outputs for given desired temperature parameters.

The first column or binary count represents a number of pulses issued by the processor 136 at its output R6 for a given BAKE temperature (in the second column) or a selected TOAST color (in the third column). As will be noted, the processor is preprogrammed to provide the maximum count in the BROIL mode which corresponds to a temperature of 515° F. The binary count, therefore, represents a digital signal which corresponds to the desired temperature T1 for a given set of operating conditions. The binary number is stored in the counter 76b and applied at the parallel outputs thereof Q1–Q7 to the terminals of the ladder resistor network 76a. The equivalent representation of the resistor network 76a is shown in FIG. 7A. The circuit of 7A is so arranged that the output thereof at pin or terminal 16 is equal to one-half of the sum of all the inputs from the storage counter 76b.

TABLE 1

D/A REGISTER LOAD COUNT TABLE

| Binary Count | Temperature | Toast Color | Broil Temp. | D/A Voltage |
|---|---|---|---|---|
| 0 | 185° F. | | | .509 |
| 5 | 198° F. | | | .610 |
| 10 | 211° F. | | | .710 |
| 14 | — | 1 | | .791 |
| 15 | 224° F. | | | .811 |
| 20 | 237° F. | | | .911 |
| 25 | 250° F. | | | 1.012 |
| 28 | — | 2 | | 1.072 |
| 30 | 262° F. | | | 1.113 |
| 35 | 275° F. | | | 1.213 |
| 40 | 288° F. | | | 1.313 |
| 42 | — | 3 | | 1.354 |
| 45 | 301° F. | | | 1.414 |
| 50 | 314° F. | | | 1.515 |
| 55 | 327° F. | | | 1.615 |
| 56 | — | 4 | | 1.636 |
| 60 | 340° F. | | | 1.716 |
| 65 | 353° F. | | | 1.817 |
| 70 | 366° F. | 5 | | 1.917 |
| 75 | 379° F. | | | 2.018 |
| 80 | 391° F. | | | 2.118 |
| 84 | — | 6 | | 2.199 |
| 85 | 404° F. | | | 2.219 |
| 90 | 417° F. | | | 2.319 |
| 95 | 430° F. | | | 2.420 |
| 98 | — | 7 | | 2.481 |
| 100 | 443° F. | | | 2.520 |
| 105 | 456° F. | | | 2.621 |
| 110 | 469° F. | | | 2.722 |
| 112 | — | 8 | | 2.762 |
| 115 | 482° F. | | | 2.823 |
| 120 | 495° F. | | | 2.923 |
| 125 | 508° F. | | | 3.024 |
| 126 | — | 9 | | 3.044 |
| 127 | 515° F. | | Broil Set Count | 3.064 |

Since the voltage doublers 138 and 146 double the voltage, and the resistor network 76a divides the voltage by two, the output voltage of the resistor network $V_S$ has a value between $V_{SH}$ and $V_{SL}$. In the last column of Table 1, there are listed the values of $V_S$ as a function of the different temperatures, toast colors and, therefore, binary counts supplied to the counter 78b.

By first multiplying the voltage by two and then halving it by two, it is assured that the analog voltage from the D/A converter is sufficiently high to be useful with the semiconductor technology and components used. It may be noted that the lowest value of $V_S$ equal to 0.509 advantageously corresponds to the lower reference output voltage $V_{SL}$ while the highest value of $V_S = 3.064$ corresponds to the upper reference voltage $V_{SH}$.

The temperature set or trip voltage $V_S$ at the output of the ladder resistor network 76a is applied to the oven chip 80 by means of buffer amplifier 153 which isolates the oven chip 80 from the resistor network so that the ladder is not loaded.

The application of a voltage equal to $2V_{SL}$ to counter supply terminal $V_{SS}$ and a voltage equal to $2V_{SH}$ to power terminal $V_{DD}$ of a counter serves two purposes. Firstly, it assures that the trip voltage $V_S$ is always between the lower and higher reference output voltages. Secondly, however, such an arrangement also ensures that errors are minimized due to power supply fluctuations since increases and decreases in the power supply voltage correspondingly increases the upper and lower reference voltages as well as the trip voltage $V_S$.

Figure 8:
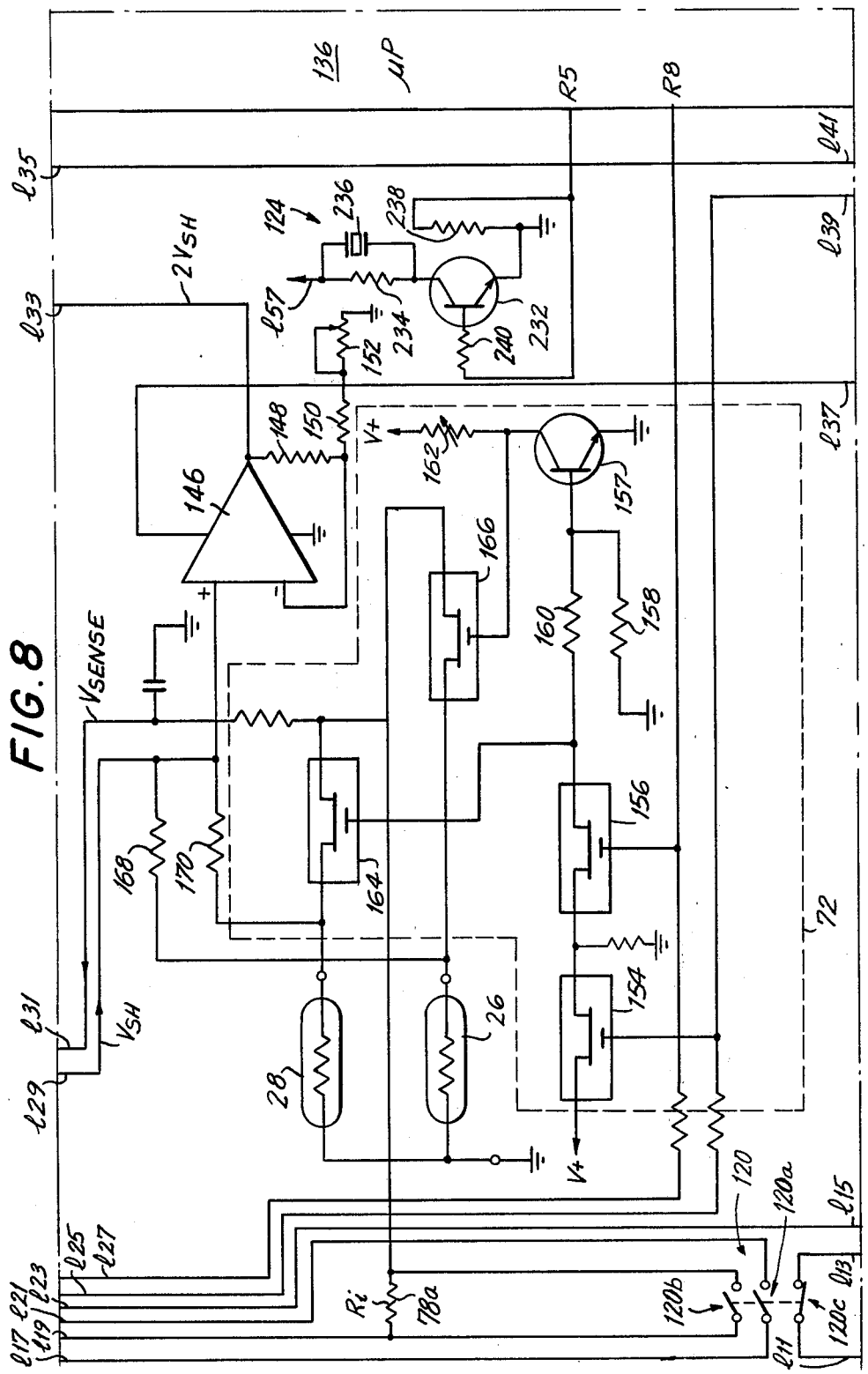

Referring to FIG. 8 there is shown within the dashed outline the sensor select circuitry identified by the same reference numeral 72 of FIG. 3. In discussing the sensor select circuitry, reference is made to Table 2 as follows:

TABLE 2

| FUNC-TION | SEN-SOR | R10 | HEATER UP | HEATER LOW | R8 $V_{IN3}$ | R9 $V_{IN4}$ | R8 . R9 (K33) |
|---|---|---|---|---|---|---|---|
| OFF | LOWER | 0 | OFF | OFF | 0 | 0 | 0 |
| BAKE | UPPER | 1 | ON | ON | 1 | 1 | 1 |
| BROIL | LOWER | 1 | ON | ON | 1 | 0 | 0 |
| TOAST | LOWER | 1 | ON | ON | 0 | 1 | 0 |

As will be noted from Table 2, the microprocessor outputs R8 and R9 assume different values depending on the function selected. The outputs R8 and R9 of the microprocessor 136 are connected not only to the sensor select circuit means 72, but also to the oven chip inputs $V_{IN3}$ and $V_{IN4}$ which, as will be noted from FIG. 4, control the function selector 82 within the oven chip as well.

The sensor circuit 72 includes two series connected bilateral switches. For example, bilateral switch types CD 4016A commercially available from RCA may be used. The input terminal of the switch 154 is connected to a source of positive voltage V+, while the output terminal of the switch 156 is connected to the base of a transistor 157 through a voltage divider formed by resistors 158 and 160. The gate of a further bilateral switch 164 is connected to the output terminal of the switch 156, while the input terminal of the switch 164 is connected to the upper sensor 28. Similarly, a bilateral switch 166 at the input terminal thereof is connected to the lower sensor 26, while the gate thereof is connected to the inverter transistor 157 between the collector thereof and a collector resistor 162.

The output terminals of both bilateral switches 164 and 166 are connected to the sense line which applies $V_{SENSE}$ via lead 131 to the $V_{SENSE}$ input terminal of the oven chip 80. As will be clear, the bilateral switches 164 and 166 act as switches for selectively applying the sensor voltages $V_{SENSE}$ to the sense line, the specific switch which is actuated being determined by the enable circuitry which includes the bilateral switches 154, 156 and the transistor 157.

In operation, in the BAKE mode, both processor terminals R8 and R9 are high or at the "1" level thereby turning-on both bilateral switches 154, 156, this decreasing the resistance through said devices and applying a positive voltage both to the gate of the switch 164 and to the base of the inverter transistor 157. With switch 164 turned on, it is the voltage across the upper temperature sensor 128 which is applied to the sense line or lead 131. The application of the positive voltage to the transistor 157 saturates the transistor and its collector voltage drops to virtually zero, this having the effect of turning off the switch 166 thereby preventing the voltage across the lower sensor 26 from being applied to the sense line. Therefore, the upper sensor is only utilized in the BAKE mode, for reasons which will become more apparent hereafter.

By similar analysis, it is readily determinable that with the other combinations of outputs at terminals at R8 R9 of the microprocessor, the device will always monitor the lower sensor, and not the upper sensor as in the BAKE mode.

The lower sensor 26 forms a voltage divider with resistor 168, while the upper sensor 28 forms a resistor divider with resistor 170. In each case, the voltage across the respective sensor is a function of the divider networks thus formed to which the upper reference voltage $V_{SH}$ is applied.

In the BAKE mode, it is the temperature in the oven cavity that is of importance. It is in this mode that the upper sensor element 28 provides the most accurate readings. However, in the BROIL mode, the lower sensor provides the more relevant information since what is of interest is the temperature of the oil which normally drips in the pan during the broiling mode of operation. Thus, while initiation of the BROIL mode provides a full binary count corresponding to a temperature of 515°, the upper heaters are set for maximum heat until the lower sensor detects 350° F. At this time, the control circuit advantageously turns the heater off since the temperature of 350° F. is sufficiently and safely below the flash point of oil, thereby avoiding the burning of the oil and damage to the home or appliance.

In the TOAST mode, the lower sensor is used because of its proximity to the wire support or rack 18 on which the bread slices are placed. Such proximity of the bread slices to the lower sensor is important to provide accurate difference voltages $V_D$, as more fully discussed in the above-identified U.S. patent application Ser. No. 6/095867.

Figure 9:
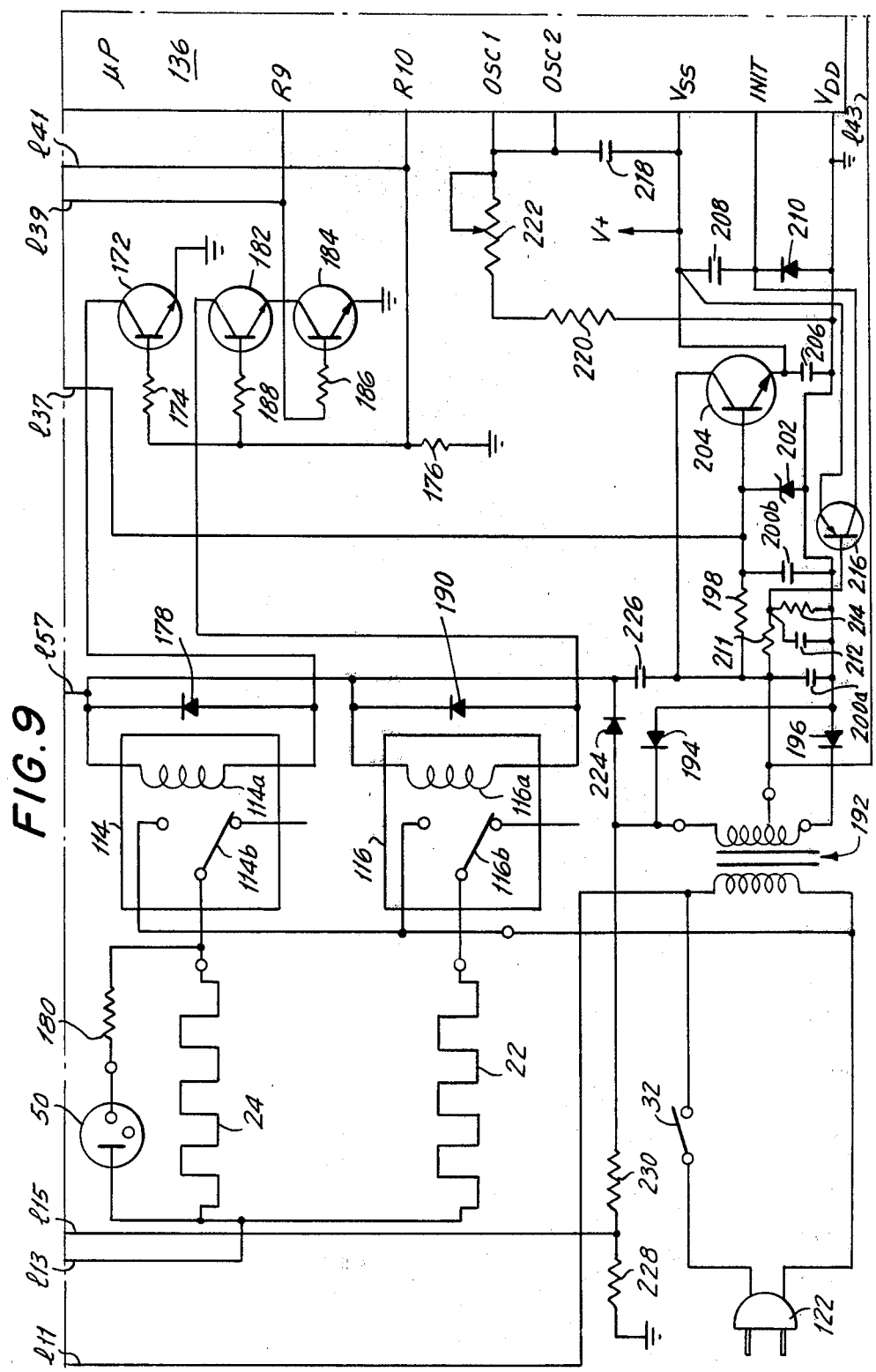

The equivalent of the heater control circuit 108 as shown in FIG. 3 and the power supply of the appliance is illustrated in FIG. 9. The microprocessor 136 also controls the heaters when the heaters are energized. The relay coil 114a of the relay 114 is connected between a source of positive voltage and the collector of a transistor 172 the base of which is connected through resistor 174 with resistor 176 which is a pull down resistor to the microprocessor output terminal R10. As is evident from Table 2, when R10 is equal to 0, both upper and lower heaters are off. Referring to FIG. 9, it is seen why this is the case. When a low voltage is applied to the base of the transistor 172, that transistor is non-conducting and a current cannot flow through the relay coil 114a and, therefore, the relay contacts disconnect the upper heater from the power lines. On the other hand, whenever R10 is high or at the "1" level, the transistor 172 is saturated and a current is permitted to flow through the relay coil 114 thereby energizing the upper heater element 24. However, with respect to the lower heater element, it is important that the transistors 182 and 184, which are connected in tandem, both be conductive. This can only be the case where both terminals R9 and R10 are both high or at the "1" level. Under those circumstances, not only does transistor 172 become saturated but the "1" levels applied through base resistors 186 and 188 causes both transistors 182 and 184 to saturate thereby permitting a current to flow through the relay coil 116a. It is only in the BROIL function that the upper heater is on and the lower heater is off although, as noted above, it is the lower sensor that is monitored and not the upper sensor during the BROIL operation. During BROIL, R10 is high or "1" while R9 is low or "0". Under those circumstances, transistor 172 is saturated, thereby actuating relay 114 while transistor 182 is cut off and prevents current flow through the coil of the relay 116.

Advantageously, diodes 178 and 190 are placed in parallel with relay coils 114a and 116a, respectively. These diodes serve to limit high voltages across the coils and possibly damage the coils and their transistor drivers. The power supply includes a transformer 192, a full wave rectifier including diodes 194 and 196 being connected across the secondary winding of the transformer 192, a filter or smoothing circuit including current limiting resistor 198 and bypass capacitors 200a and 200b which provide filtering. At the output of the filtering circuit there is provided a zener diode 202 to stabilize the power supply voltage which is supplied to the power supply terminals $V_{SS}$ and $V_{DD}$ of the microprocessor.

Power-up refers to when the power supply voltages are initially applied to the microprocessor. Reset, on the other hand, is when the power supply voltages have already been applied and it is desired to restart program execution at the beginning of the series of instructions. A simple circuit including a capacitor 208 in series with diode 210 may be used to power-up. When power is supplied to the appliance, such as by the closing of the power switch 32, voltages are applied to the microprocessor terminals $V_{SS}$ and $V_{DD}$ this being sufficient, with the circuitry shown, to power-up the microprocessor. A fail-safe feature for short power failures includes resistor 211, with the parallel capacitor 212 and resistor 214 circuit shunting the base of transistor 216 which emitter-collector terminals are connected across the capacitor 208. This circuit forces the processor to reset during falling and rising edges of power supply voltages when, however, the processor is still functional to thereby prevent hang-ups when power returns but memory may have been undesirably modified.

The actual machine cycle period of the microprocessor is determined by the fixed external capacitor 218, fixed resistor 220 and adjustable resistor 222, the capacitor 218 being connected between the processor oscillator terminals OSC 1 and OSC 2 and the processor supply terminal $V_{SS}$. On the other hand, the series connector resistors 220, 222 are connected between the processor oscillator terminals and the processor supply voltage terminal $V_{DD}$. The adjustable potentiometer 222 is adjusted to provide the desired microprocessor clock frequency in order to optimize maximum alarm output from a particular piezoelectric crystal.

The diode 224 and the capacitor 226 serve as additional rectifying means for providing a voltage for the relay coils 114a, 116a which need not, of course, be filtered or regulated.

The output of the secondary winding of the transformer 192 is also connected to a voltage divider comprising series connected resistors 228 and 230 for providing an alternating or sinusoidal voltage which is applied to the oven chip 80 at its input terminal $V_{AC}$ to be formed into ZC pulses as discussed in connection with FIGS. 3 and 4. Additionally, $V_{AC}$ derived from the divider of resistors 228, 230 is also applied to the microprocessor for monitoring the presence of an alternating AC voltage, as will be more fully described hereafter.

Referring to FIG. 8, the alarm circuit 124 of FIG. 3 is shown as including a transistor having a grounded emitter and a parallel circuit of a collector resistor 234 and a crystal in the nature of a piezoelectric element 236 between the collector and a source of positive voltage via lead 1 57 which is connected to the same source of voltage as is supplied to the relay coils. The processor 136 is programmed to provide 30 msec. "beeps" in the nature of positive feedback upon actuation of any of the user function or numeric keys on the keyboard, to provide alarms and to provide an audible signal when the preheat cycle has been completed in the BAKE mode. At such times that audible sounds are to be produced, the microprocessor applies an approximately 3 KHz pulse trail at the output terminal R5, this turning on the transistor 232 and causing said transistor to oscillate at the resonant frequency of the piezoelectric crystal 236 which, as noted above, is advantageously approximately 3 KHz. The microprocessor signals for the alarm are supplied to the base of the transistor 232 via resistor 240, resistor 238 being a pull-down resistor. By making resistor 234 adjustable, the loudness of the alarm may be adjusted. If this is done, the resistor 234 can be arranged to be externally or user adjustable to allow changes to the volume of the alarm to accommodate specific operating environments.

Figure 10:
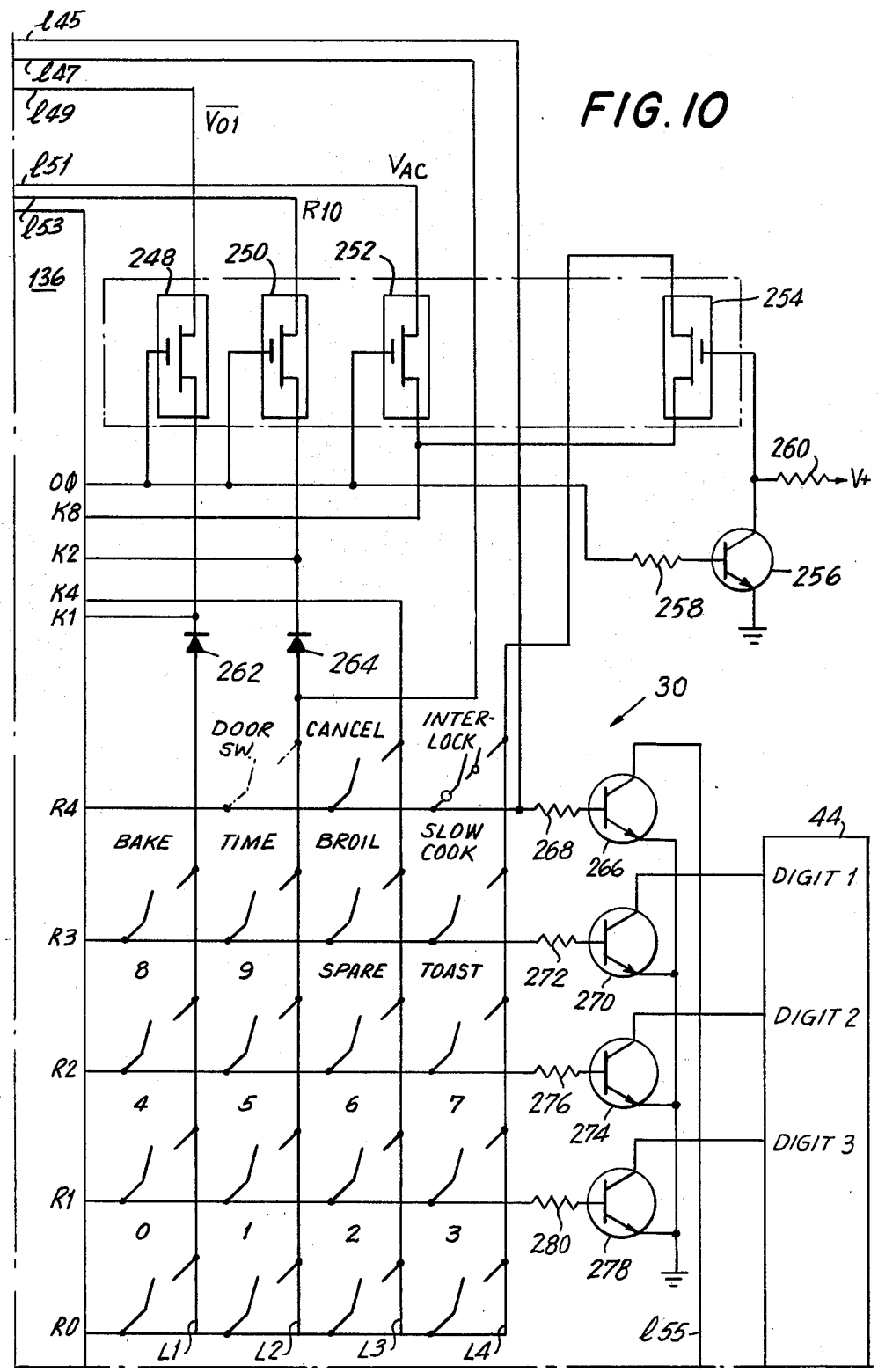

Referring to FIGS. 7 and 10, the microprocessor 136 is programmed, as noted above, to perform the various monitoring functions which are important to provide proper operation as well as to avoid unsafe operating conditions.

As discussed with reference to FIG. 3, the 60 Hz signal $V_{AC}$ is monitored and scanned on a periodic basis to determine its presence. The voltage $V_{AC}$ is important, of course, since it is used by the oven chip 80 to generate ZC pulses as discussed more fully in connection with FIG. 4. However, $V_{AC}$ is also used as a time base for the microprocessor insofar as it performs the TIMER function, $V_{AC}$ being used for all timer functions including 5-second delays, beeps and the count down preheat signal. If any malfunction occurs, and $V_{AC}$ is no longer available to the microprocessor, normal TIMER functions cannot be performed. The signal $V_{AC}$, derived from the voltage divider of resistors 228 and 230 (FIG. 9) is applied to the K8 input of the microprocessor 136 through a buffer amplifier 242 and through a semiconductor switch as will be more fully discussed below. When the input K8 is scanned for $V_{AC}$, and that signal is not present, the microprocessor initiates an internal timer which takes over the relay timer function. This allows the oven to work but the timer cannot decrement so that the oven is still operational but without the TIMER function. The internal TIMER established by the microprocessor is approximately two times as slow as the $V_{AC}$ controlled TIMER and, additionally, is not as accurate. However, upon failure of $V_{AC}$, the internal TIMER will take over and decrement any TIME period, but at a slower rate. Thus, the initial one hour SLOW COOK pre-heat period may take up to 2.5 hrs. However, after the programmed time is decremented to "0", it is no longer possible to program the TIMER and, therefore, it is no longer possible to use the TIME BAKE or TIME BROIL modes.

Without the TIMER function, the audible alarms, in some cases, will change. Thus, the signals for TOAST, interlock and R10 high will be continuous. However, the same beeps will be sounded during key entries and when BAKE preheat has been reached. Because the internal TIMER is slower without $V_{AC}$, blinking zeros will also blink slower.

The $V_{01}$ ZC pulses are likewise monitored by the microprocessor 136 since, under normal operating conditions, it is the presence of such ZC pulses that instructs the microprocessor to apply heat to the heaters, and it is the absence of such ZC pulses that instructs the microprocessor to turn off the heaters. Referring to FIGS. 7 and 10, the ZC pulses $V_{01}$ are derived from the oven chip 80 and are applied to microprocessor input K1 through transistor 244 which essentially inverts the ZC pulses at the junction between the collector of the transistor 244 and the collector resistor 246. The inverted ZC pulses $V_{01}$ are then applied to the microprocessor input K1 through an electronic switch as to be more fully described. The microprocessor output R10, which provides the turn-on signals to the heater relays 114 and 116, is also connected to the microprocessor input K2. This connection is through an electronic switch, as will be more fully described below.

Also connected to the microprocessor is one of the poles 120a of the door switch 10. The pole 120a is normally open and has one of its terminals connected directly to the outputs R4 of the microprocessor, with another one of its terminals being connected to the keyboard line L2. In this way, as will be more fully described, opening of the door 16 interrupts the operation of the unit, the manner in which the unit reacts to such opening being a function of the mode of operation that the unit was in when the door was opened.

The four data input terminals of the TMS 1100 are K1, K2, K4 and K8. Each time an input word is requested, the data path from the K inputs are enabled. The inputs are either tested for a high level, or the input data is stored in the accumulator for further use. The R outputs, as noted, usually multiplex the inputs to thereby perform the sampling function of the scanner 118 in FIG. 3. In order to provide the desired multiplexing, and to scan both the keyboard 30 as well as to monitor the operating conditions of the control circuit as described above, namely the presence of $V_{AC}$, R10, $V_{01}$ and the condition of the door switch, there is provided a series of electronic switches 248, 250, 252 and 254 which may be a quad-bilateral switch type CD4016A manufactured by RCA.

The gates of the switches 248, 250 and 252 are all connected to the microprocessor output $O\phi$. The gate of the switch 254 is connected to the processor output $O\phi$ by means of inverter transistor 256 and base resistor 258. Transistor 256 has a collector resistor connected to the positive supply voltage. The switches 248, 250, 252 and 254 have low "on" resistances, typically several hundred ohms, so that when a "1" voltage is applied to a gate the input and output terminals of the switch are effectively shorted. With this arrangement, it is clear that during one sampling or testing period when the output of the processor $O\phi$ is high or "1", all three switches 248, 250 and 252 are turned on and $V_{01}$ is applied to K1, R10 is applied to K2 and $V_{AC}$ is applied to K8. Normally, the processor output $O\phi$ is at the low or "0" level. It increases to "1" during clock update and the detection or monitoring phase.

As noted above, the processor outputs R0–R4 issue strobing voltages which are applied to the keyboard 30 and, as will be described hereafter, to the display 44. Accordingly, closing one of the function or numeric keys, or upon the closing of one or more switches in the appliance which can be represented as keyboard switches, one or more strobing signals from the outputs R0–R4 may appear on one or more of the keyboard lines L1–L4. Since L1 is also connected to the processor input K1, there is provided a diode 262 connected between the L1 line and the input K1, which diode becomes back biased when the switch 248 is turned on so as to block the application of the voltage $V_{01}$ from being applied to the keyboard line L1 and, therefore, possibly to the display 44 as will hereinafter become evident.

nect the R2 line with the L3 line. Also not shown in FIG. 2 are the one or more interlock switches which, if

TABLE 3

O OUTPUT PROGRAMMING

| # | SL | A8 | A4 | A2 | A1 | LED → Output Function | Segment → g Timer $O_7$ | f Time $O_6$ | e Broil $O_5$ | d Bake $O_4$ | c Toast $O_3$ | b $O_2$ | a Temp. $O_1$ | 60HZ, V01 Control $O_0$ |
|---|----|----|----|----|----|----|----|----|----|----|----|----|----|----|
| 1 | 0 | 0 | X | 0 | 0 | Temperature | 0 | 0 | 0 | 0 | 0 | 0 | 1 | 0 |
| 2 | 0 | X | X | 1 | 0 | Bake | 0 | 0 | 0 | 1 | 0 | 0 | 0 | 0 |
| 3 | 0 | X | X | 1 | 1 | Broil | 0 | 0 | 1 | 0 | 0 | 0 | 0 | 0 |
| 4 | 0 | X | 1 | X | X | Timer | 1 | 0 | 0 | 0 | 0 | 0 | 0 | 0 |
| 5 | 0 | 1 | 1 | X | X | Time | 0 | 1 | 0 | 0 | 0 | 0 | 0 | 0 |
| 6 | X | 0 | 0 | 0 | 1 | 1 | 0 | 0 | 0 | 0 | 1 | 1 | 0 | 0 |
| 7 | 1 | X | 0 | 0 | 0 | 0 | 0 | 1 | 1 | 1 | 1 | 1 | 1 | 0 |
| 8 | 1 | 0 | 0 | 1 | 0 | 2 | 1 | 0 | 1 | 1 | 0 | 1 | 1 | 0 |
| 9 | 1 | 0 | 0 | 1 | 1 | 3 | 1 | 0 | 0 | 1 | 1 | 1 | 1 | 0 |
| 10 | 1 | 0 | 1 | 0 | 0 | 4 | 1 | 1 | 0 | 0 | 1 | 1 | 0 | 0 |
| 11 | 1 | 0 | 1 | 0 | 1 | 5&S | 1 | 1 | 0 | 1 | 1 | 0 | 1 | 0 |
| 12 | 1 | 0 | 1 | 1 | 0 | 6 | 1 | 1 | 1 | 1 | 1 | 0 | 1 | 0 |
| 13 | 1 | 0 | 1 | 1 | 1 | 7 | 0 | 0 | 0 | 0 | 1 | 1 | 1 | 0 |
| 14 | 1 | 1 | 0 | 0 | X | 9 | 1 | 1 | 0 | 1 | 1 | 1 | 1 | 0 |
| 15 | 1 | 1 | 0 | 1 | 1 | r | 1 | 0 | 1 | 0 | 0 | 0 | 0 | 0 |
| 16 | 1 | 1 | 1 | 0 | 1 | E | 1 | 1 | 1 | 1 | 0 | 0 | 1 | 0 |
| 17 | 1 | 1 | 1 | X | 0 | L | 0 | 1 | 1 | 1 | 0 | 0 | 0 | 0 |
| 18 | 1 | 1 | X | 1 | 0 | o | 1 | 0 | 1 | 1 | 1 | 0 | 0 | 0 |
| 19 | 1 | 1 | 1 | 1 | 1 | Vol, 60HZ on | 0 | 0 | 0 | 0 | 0 | 0 | 0 | 1 |
| 20 | 0 | 1 | 0 | 0 | 1 | 8 | 1 | 1 | 1 | 1 | 1 | 1 | 1 | 0 |

X = don't care
's 1–7, 14, 17 and 18 are used in combinations to yield displays of b, Time-Bake-Min., etc.

Similarly, a diode 264 is placed in the L2 line to avoid spurious applications of signals from the processor R10 to the line L2 and possibly the display 44 during the clock update and detection or monitoring phase when Oφ becomes "1".

Although diodes 262 and 264 can be used in the keyboard 30 lines L1 and L2, a diode could also be used to replace the switch 254, transistor 256 and resistors 258 and 260. However here, the keyboard line L4 is connected to the processor input K8 through the electronic switch 254 and the inverting transistor 256 as described. With this arrangement, during the clock update and detection or monitoring phase, when the output Oφ is "1" the alternating voltage $V_{AC}$ is applied to the input K8 but the line L4 is isolated from said voltage because of the switch 254 which is turned off by the inverter 256. On the other hand, during the keyboard/display drive mode, when the output Oφ is low, the keyboard line L4 is connected to the input K8 through the now-turned on switch 254.

It will be noted that the keyboard line L3 is permanently connected to the input K4 and no special precautions must be taken here because the input K4 does not receive any other inputs during the clock update and power or monitoring phase.

Examining the keyboard 30 in greater detail in FIG. 10, it is noted that it is arranged as a grid of intersecting "R output" horizontal lines and vertical "L" lines which are not, however, connected to each other. Each vertical and horizontal line may, however, be connected, at least momentarily, by a normally opened switch which is connected to the two lines as shown. The switches are normally open, and these switches shown represent all of the function user keys and numeric keys shown, for example, in FIG. 2. Reference numerals have not been used for the various keys in FIG. 10 for the sake of clarity. It will be noted that some additional switches are shown which do not appear on the keyboard panel 30 in FIG. 2. One such switch is a "spare" switch which, if used, would conused, would connect the R4 line and the L4 line. Such interlock switches, as noted above, are used to prevent hazardous operating conditions once a panel of the appliance is removed to thereby expose the oven cavity and, therefore, result in a fire hazard. Such interlock switches would, in any event, be hidden and not available on the keyboard panel 30. Also shown in FIG. 10 is the effective presence of the door switch which has been shown in dashed outline and which, when closed, connects the R4 line and the L2 line. The effective presence of the door switch exists, of course, by virtue of the connection of the L2 line of the keyboard with one terminal of the door switch 120a and the connection of the R4 line with the other terminal of the door switch.

The microprocessor 136 also drives the three digit LED display 44 as well as the various display function LEDs on the keyboard panel 30. The only visual indicator on the keyboard panel 30 which is not directly driven by the processor is the heat on light 50 which, as noted from FIG. 9, is lit when power is applied to the upper heater element 24.

Figure 11:
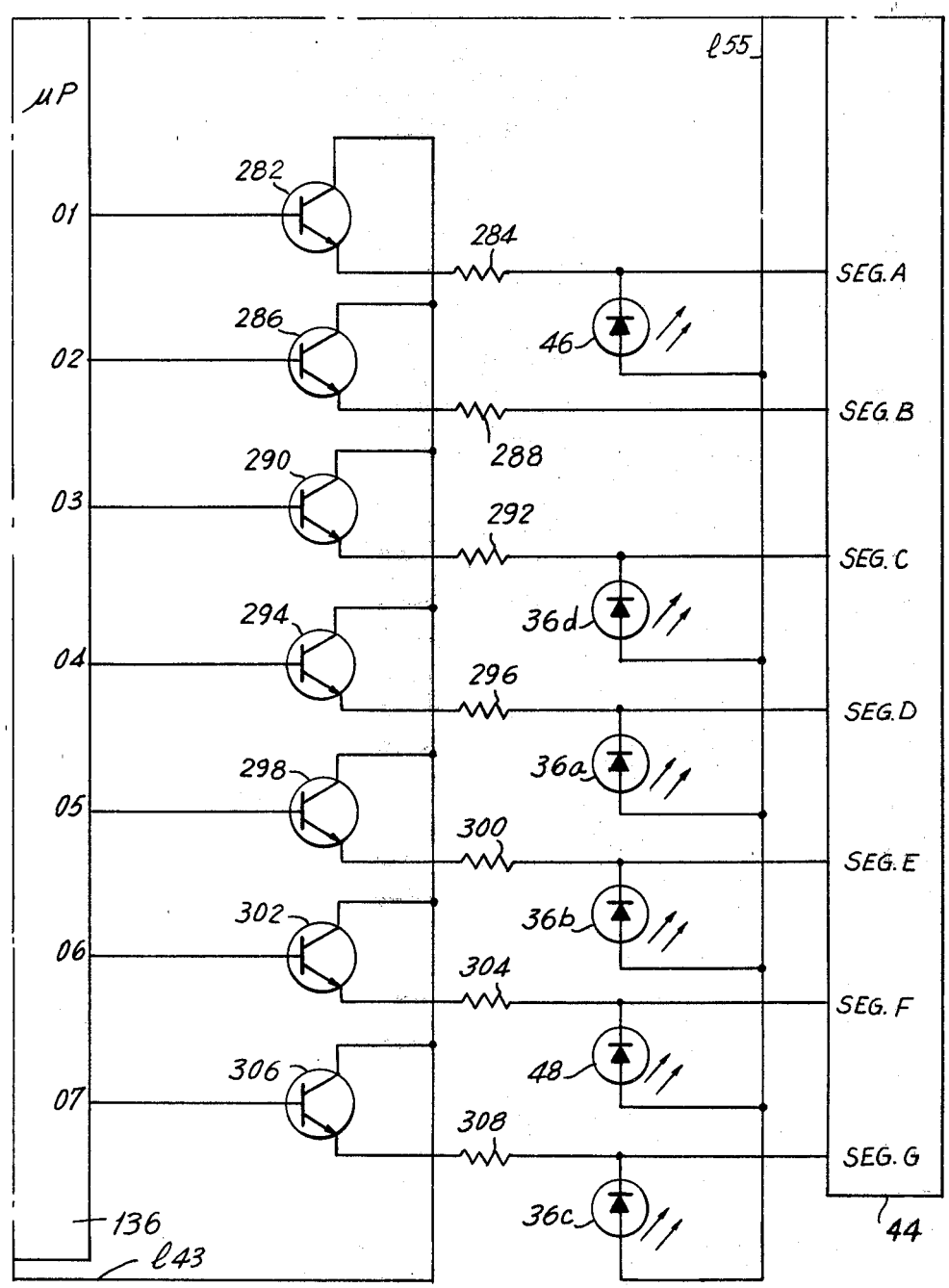
Figure 12:
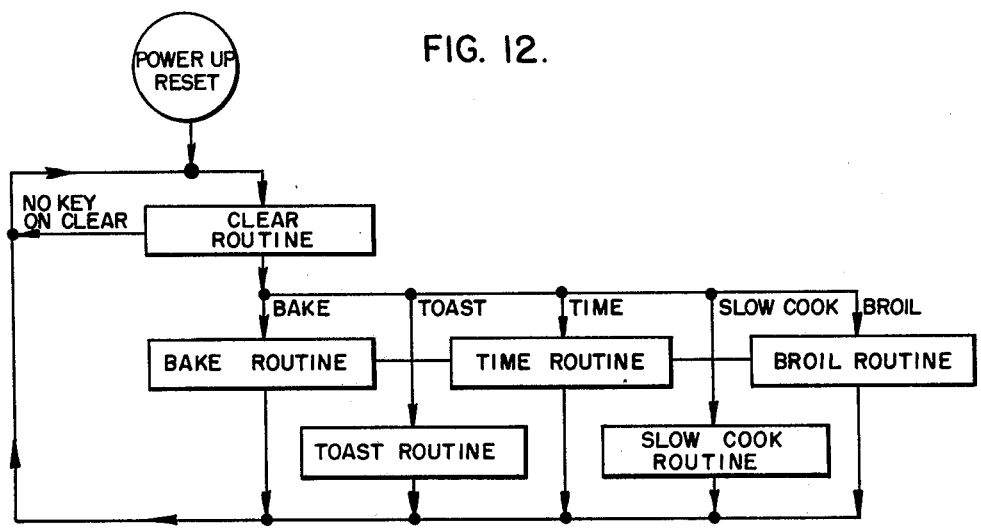
FIG. 12 is a flow chart illustrating the general sequence of the operation of the presently preferred embodiment shown in FIGS. 5-11.
Figure 17:
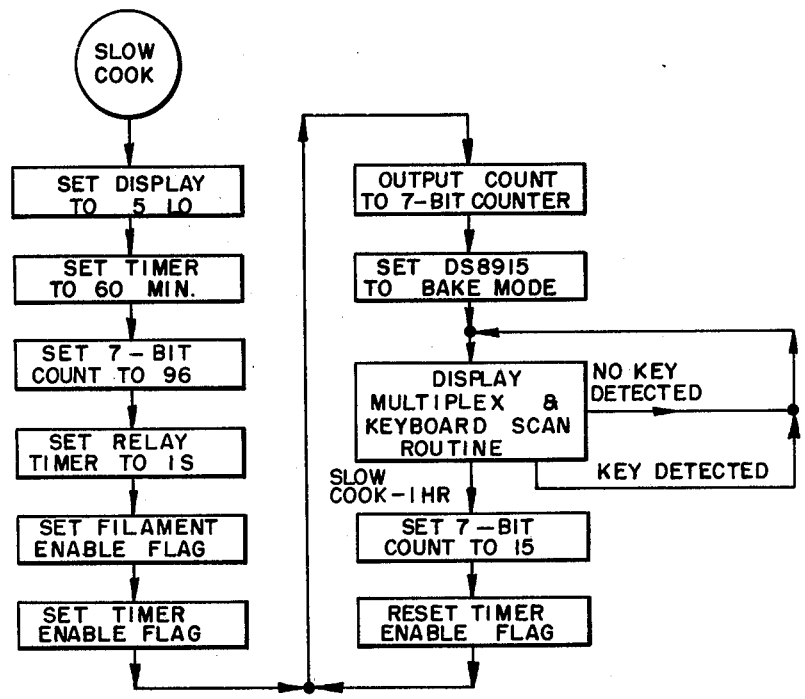
Figure 13:
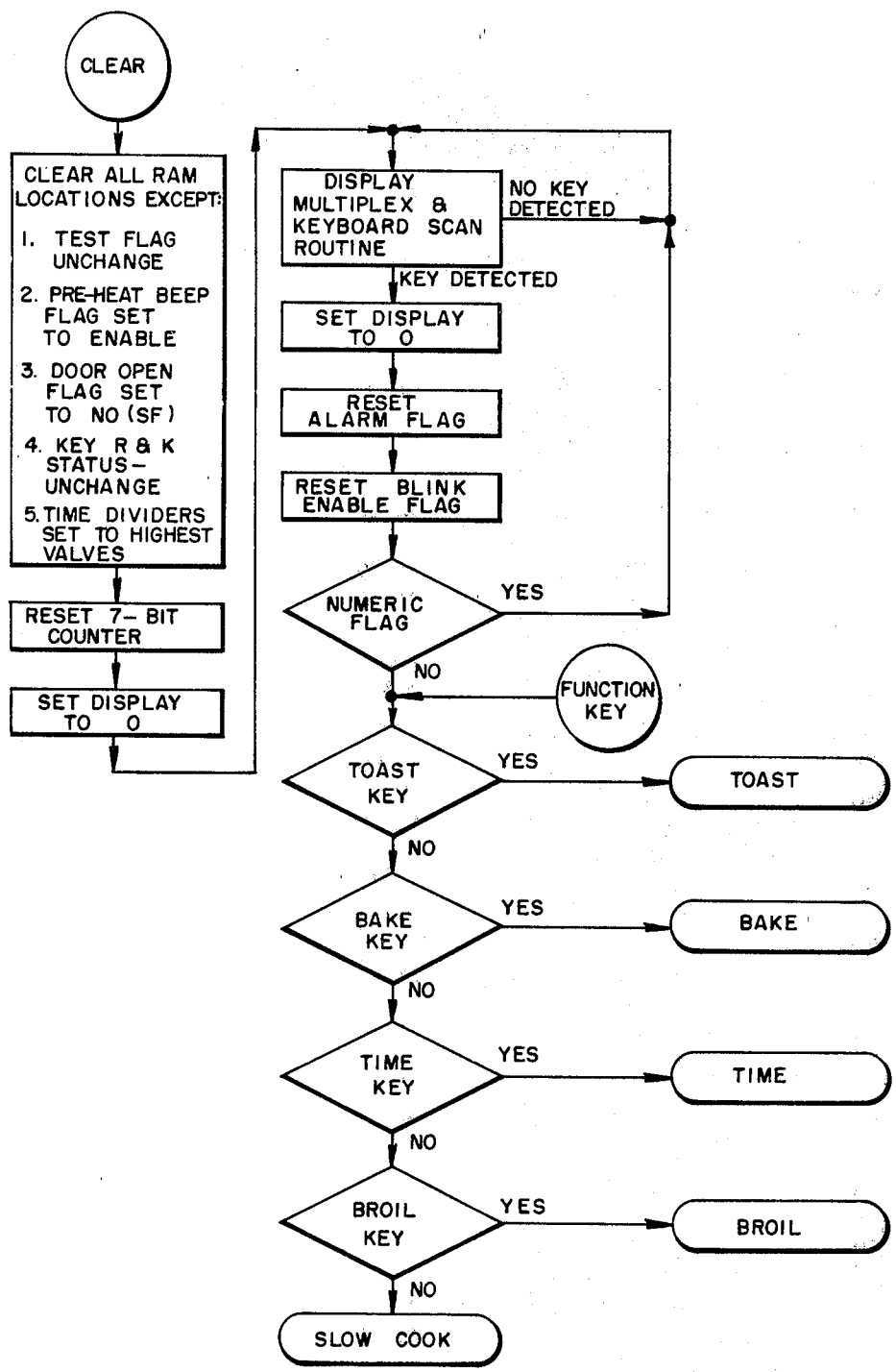
Figure 14:
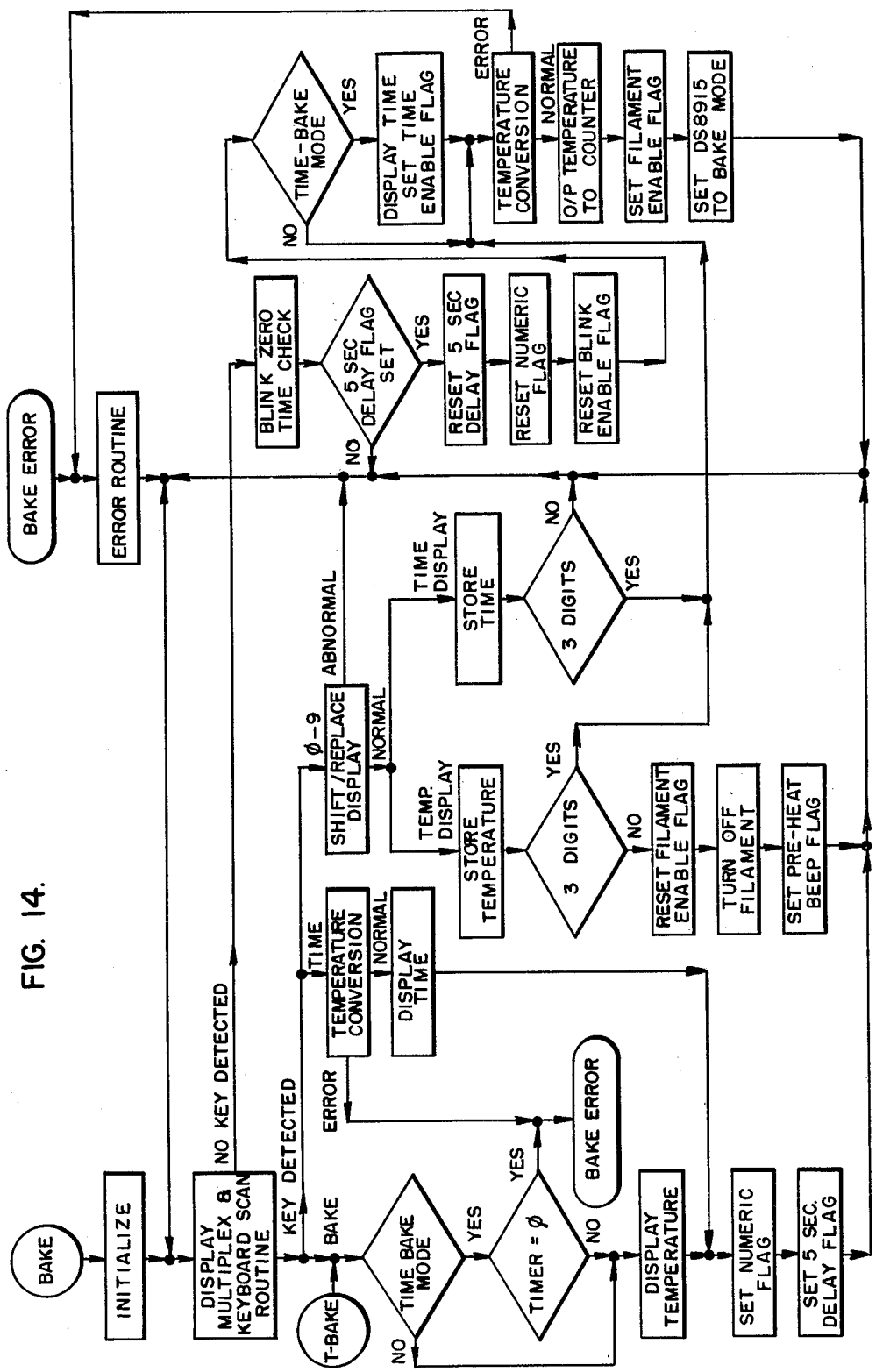
Figure 15:
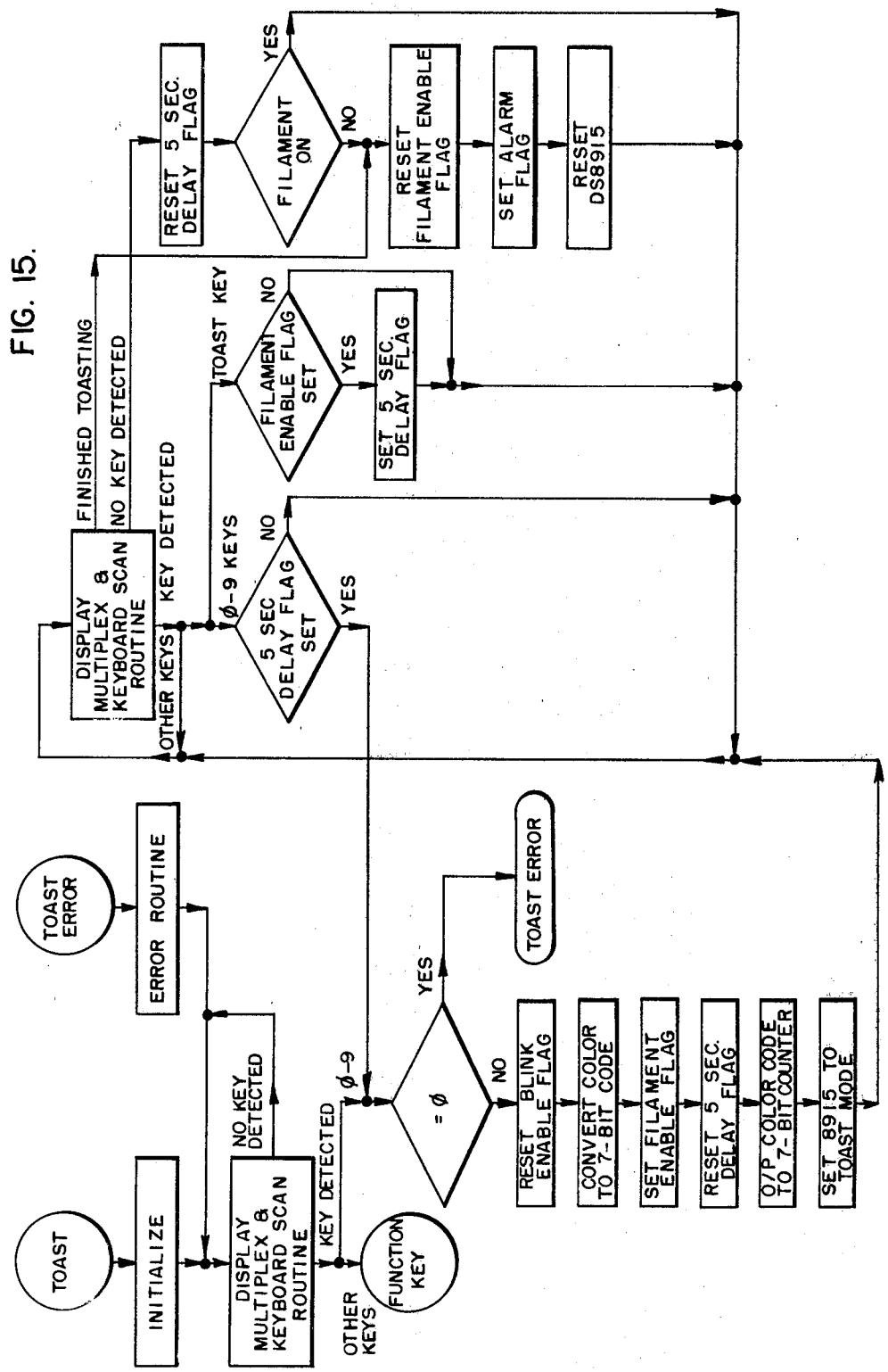
Figure 16:
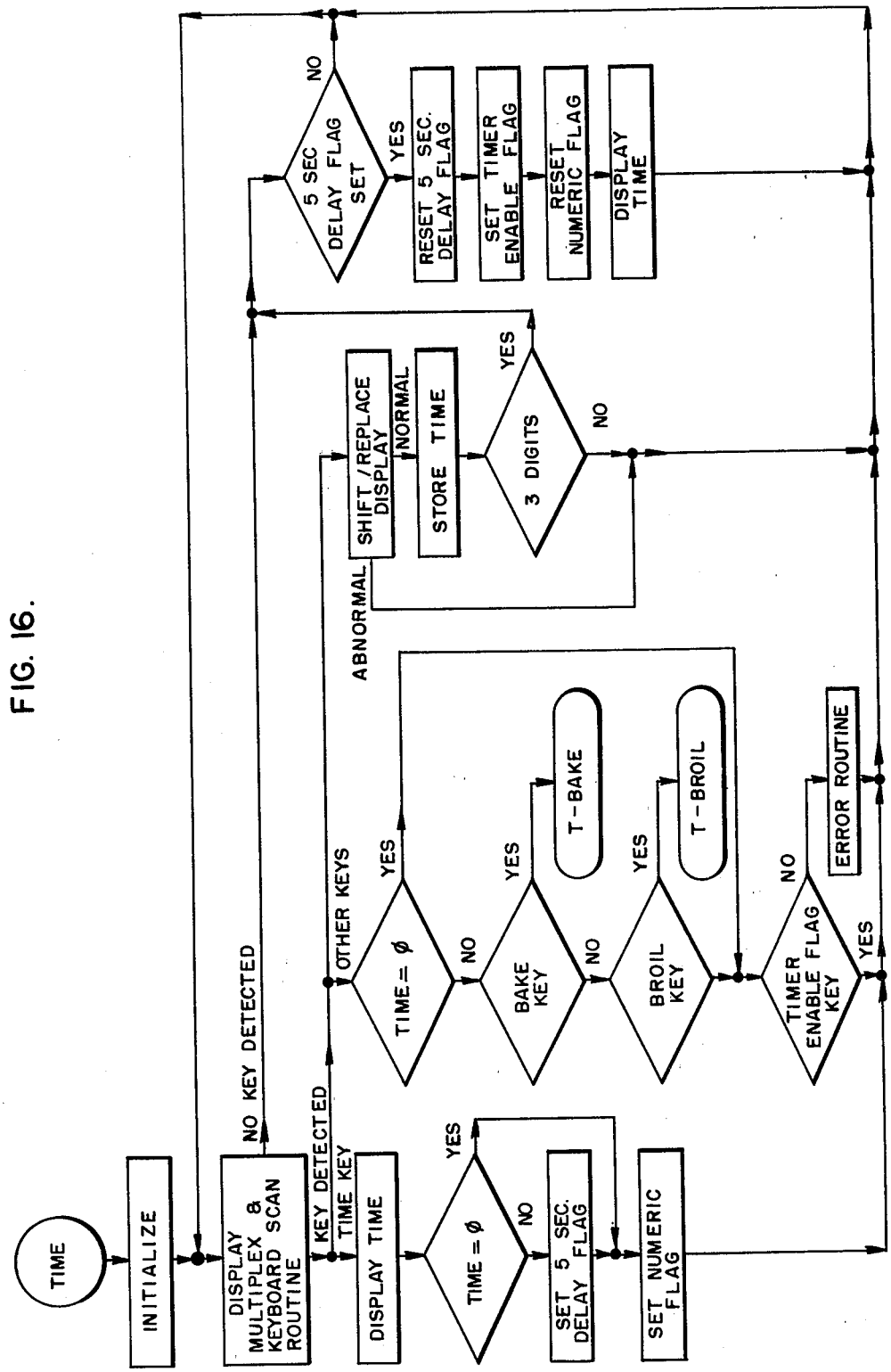
Figure 18:
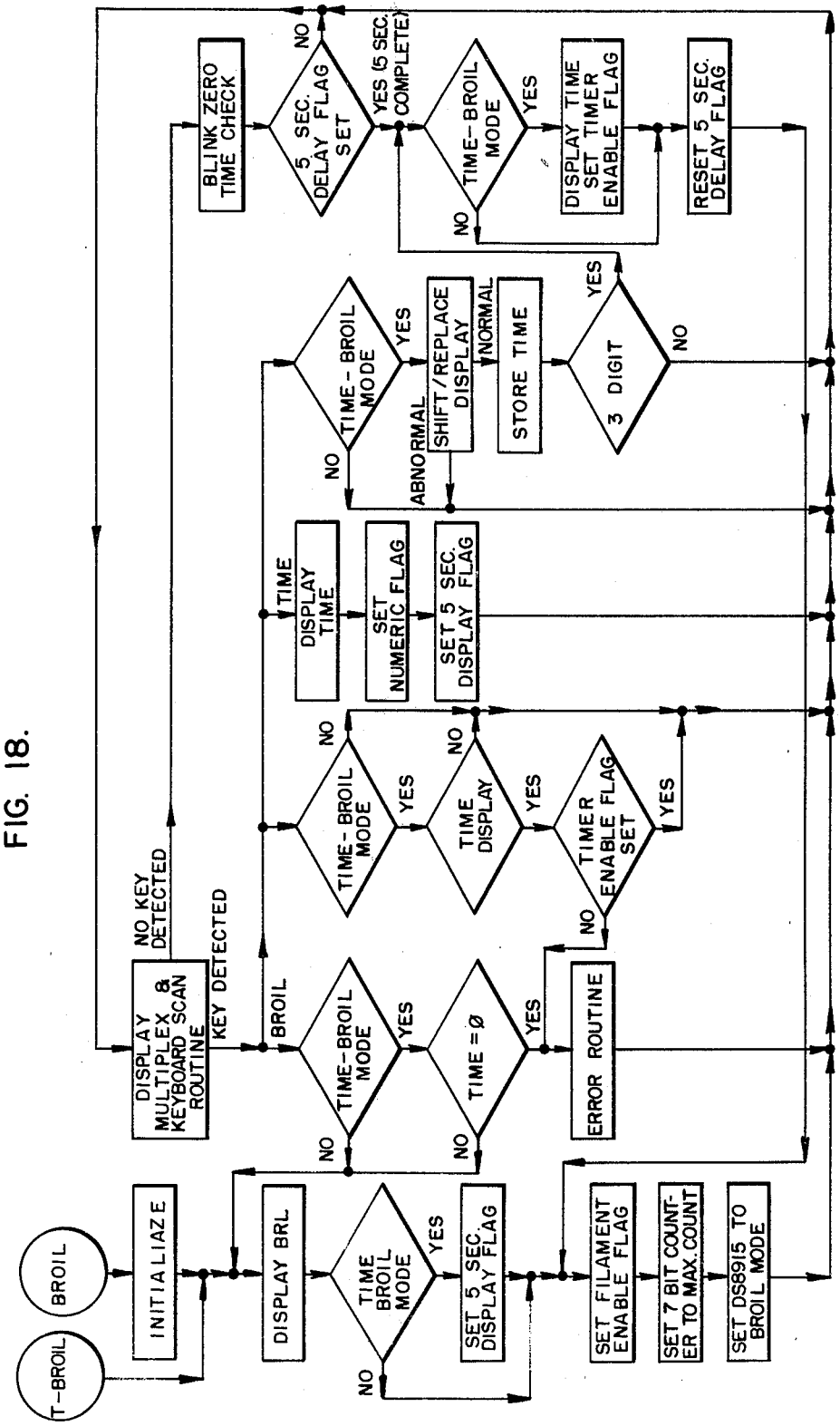

The R4 line is connected to the drive transistor 266 through base resistor 268. While the emitter of the transistor 266 is grounded, the collector thereof is connected to the various function LEDs 36a, 36b, 36c, 36d, 46 and 48 (FIGS. 10 and 11). Similarly, drive transistor 270 is connected to the strobing output R3 through base resistor 272, the drive transistor 274 is connected to the strobing output R2 through base resistor 276 and drive transistor 278 is connected to the strobing output R1 through base resistor 280. The emitters of the transistors 270, 274 and 278 are all grounded, while the collectors of these transistors are respectively connected to one of the digit select terminals of the three-digit LED display 44.

Additionally, drive transistors 282, 286, 290, 294, 298, 302 and 306 have their respective bases connected to processor outputs O1, O2, O3, O4, O5, O6, O7. While the collectors of all the aforementioned transistors are connected to a power supply positive voltage, namely the voltage developed across capacitor 200a in FIG. 9, the emitters of these transistors are respectively connected to the segment select input for segments A-G through respective emitter resistors 284, 288, 292, 296, 300, 304 and 308.

Since the R-output lines are strobed sequentially, application of a "1" voltage at R1 selects the third digit on the display 44 for actuation. The specific segments of the third digit which become lit is, of course, determined by the output lines O1-O7 and, therefore, the particular segments of the seven segments which can be lit. Similarly, when a "1" output is impressed upon the R2 line, the second digit is selected and, again, the second digit will have those segments lit depending on the processor outputs O1-O7. The same is true for the first digit when a "1" output appears on the R3 line. However, when a "1" level is applied on the R4 line, neither one of the digits is selected since all three transistors 270, 274, 278 are turned off. Instead, the R4 voltage turns on transistor 266 thereby enabling one or more of the function LEDs to be energized. Which specific LEDs will be energized will, again, be a function of which of the processor outputs O1-O7 are high or at the "1" level. Thus, while each digit and each function LED is only lit for a fraction of the total cycle time, the repetition rate is sufficiently high so as to avoid flickering and make it appear that the digits and the function LEDs are continuously lit during the multiplexing operation. Such strobing of displays is well known in the art.

The output programming for the microprocessor 136 which determines which segments and which function LEDs are lit for the various output functions makes use of a programmable logic array (PLA). As noted above, the PLA can be programmed so that the user can define the desired voltage levels at the various processor outputs O1-O7 for a given output condition. A PLA may be regarded as a functional mapping from a set of input values (called input terms) into a set of output values (called output terms). When the input to a PLA matches an input term, the corresponding output term is selected as output. More than one input term may select a given output term. In the TMS 1100 the output register has 5 bits identified in Table 3 as A1, A2, A4, A8 and SL. These 5 bits represent the 4 bits from an accumulator register and a single status latch bit. The PLA outputs are O$\phi$-O7 which are connected to the output pins. The output transforms the 5-bit input code into an 8-bit output code, as shown in Table 3. It will be noted, for example, that the output O$\phi$ is zero for all output functions except for monitoring or sensing of 60 Hz signals and ZC signals $V_{01}$. At all other times, the processor strobes the keyboard and display as above noted. As also suggested, two or more PLA functions may be combined, as long as they are not inconsistent with each other. Thus, for example, if outputs 17 and 18 are combined the "L" and the "o" will combine to produce the letter "b" on the display 44. Similarly, it will be noted that the TIMER function may be combined with the BROIL and BAKE functions since the 5-bit input signals applied to the output PLA are not inconsistent with each other. Therefore, they may be combined.

The pole 120c (FIG. 8) is the normally closed switch placed in series between the power line voltage and the hearing elements 22, 24. The switch 120c opens when the door of the appliance is opened thereby cutting the power to the heating elements. The other pole 120b of the door switch is, as shown in FIG. 8, placed in parallel with integrating resistor 78a. The integrating capacitor of the toast integrator circuit is designated by the reference numeral 78b in FIG. 7 across oven chip 80 terminals $V_{SL}$ and $V_D$. The operation of the toast integrating circuit is more fully described in the above-identified U.S. Application Ser. No. 6/095, 867.

To assist the user in making entries, there is advantageously programmed into the microprocessor 136 means for producing blinking of the display 44 to suggest to the user that certain entries must be made. The internal programming, upon determining that additional data is necessary, causes a blink flag to be set. When this occurs, a blinking $\phi$ appears on one of the three digits of the display 44 and suggests to the user that an additional digit or numerical entry may be made.

If two or more function keys are depressed in sequence the last function key depressed will be programmed while the previous function will be cancelled, except SLOW COOK and BROIL which start immediately. This is true for all functions except TOAST. After the TOAST key is pressed, the only proper key that can be depressed is a toast color key or numeric key for digits 1-9. Once a toast color key has been depressed, a new toast color can only be reset if the TOAST key is again depressed.

Opening of the door 16 clears the system in the TOAST mode. In all of the modes, only the heaters and the TIMER stop but resume operation when the door is closed. In the TOAST mode, however, the selected TOAST function must again be reset.

Since depression of the TOAST function key requires the subsequent entry of a toast color key or digit 1-9, the subsequent depression of another function or timekey results in an error message. An error message is also issued on the display 44 when the BAKE function key is followed by only two digits and a third digit is not entered within the five-second delay period. This occurs because, as noted, the only valid BAKE temperatures are between 185° and 515° F. Therefore, temperature settings outside of that range result in an error signal. Additionally, since the numeric key "$\phi$" is not a valid toast color, depression of the TOAST key followed by depression of the "$\phi$" key likewise produces an error signal. Error signals are also issued when the TIMER function key is depressed without being followed up with digits but followed by another function, and when the TIMER key is depressed with less than three digits followed by non-timed function within five seconds. Errors can be corrected by depressing the correct key which can be determined by the TEMP-/TIME LEDs in conjunction with the function LEDs. They may also be corrected by depressing the proper function key and making a correction or by clearing by pressing the CANCEL key 34f.

When the system is in any mode, it will ignore extraneous key entries (digits especially) which are not part of that mode of operation, such as BROIL when in the TIME BAKE mode, without showing an error.

Briefly, the toaster-oven appliance, in the BAKE mode, can be programmed to a temperature between 185°-517° F., displayed in the three-digit display 44. In the TOAST mode, a toast color between 1 and 9, ranging between light and dark may be selected. The BROIL function is preprogrammed for 515° F. but, since the flash point of oil is approximately 500° F., the power to the heating elements is cut off at 350° F. as a safety precaution. In the TIMER mode, the display shows the remaining time in minutes alone or with BAKE or BROIL, and the timed periods can range from 1 minute to 999 minutes. In SLOW COOK, the processor is programmed to set the oven temperature to 435° F. for one hour and then 225° F. indefinitely. When the TOAST key is depressed, the toast LED will light and a "0" will flash on the display indicating an input is required. A toast color is entered from 1–9 (a "0" entry will give an "Err" indication). When the toast color digit is entered the system will start immediately. The system will then respond to door, interlock, toast or clear. If TOAST is depressed the system will continue with the previous TOAST but will allow a new toast color to be entered within five seconds of the TOAST entry. If a digit is depressed within five seconds a new count will be entered without interrupting TOAST. A door open will clear the system in the same way as the CANCEL key. If the system is cleared by either a door open or CANCEL, the TOAST function must be reprogrammed to do a second TOAST function. Where the TOAST function is complete the alarm shall sound and power interrupted. The alarm will turn-off with a door open or CANCEL.

With regard to the monitoring features of the invention, it is desirable that if $V_{01}$ fails in the LOW mode, i.e., does not return to the high level voltage between zero crossings, the microprocessor will turn off power to the system. This assures that such a failure immediately turns off the power to the heaters. Similarly, the R10 output of the TMS 1100 is monitored by the microprocessor and if it ever stays high when it is expected to be low, the display will illustrate "ILL" and the alarm will sound indicating that the operator must turn off power and correct the dislodged back door or have the unit serviced. With respect to a 60 Hz failure, the processor is advantageously programmed with a software timer internally implemented which takes over the relay timer function and allows the timer to be turned off in a maximum time of approximately two seconds. This allows the oven to work but will not allow the timer to be programmed. At this time, the system ignores all time entry inputs, when the 60 Hz is lost, and only flashes a "O". This indicates to the user that the timer is not working. The oven, however, is still partially operational without the TIMER as described above.

While the operation of the presently preferred embodiment has already been described to a great extent in connection with FIGS. 5-11, there is annexed to this specification as an Appendix some specific examples which will additionally illustrate the operation of the microprocessor-based toaster-oven appliance. The Appendix includes a series of sequence charts illustrating the various outputs from the processor in response to user actuated steps such as depression of user actuatable keys on the keyboard 30, opening the door, and making or failing to make entries within the five-second delays. In each case, notes are provided in the right hand column to explain the significance or the effect of such user step. Additionally, the sequence chart in the Appendix illustrate the condition of the display, the function LEDs, the R5-R10 outputs for mode selection, the inputs to the A/D converter, the outputs to the sensor select and heater select circuitry, as well as the output to the alarm.

(b) Control Program (FIGS. 12–34)

The control circuit will now be described with reference to the accompanying flow charts shown in FIGS. 12–34. From these charts one of ordinary skill in the art can prepare a set of instructions for permanent storage in the ROM of the microprocessor, which would enable the microprocessor to perform the various control functions of this invention which have been described above.

A. GENERAL SEQUENCE (FIG. 12)

When power is applied to the system, it immediately enters the CLEAR subroutine and waits in the Display Multiplex and Keyboard scan routine for one of the six functions to be programmed. They are the six subroutines shown including CLEAR.

B. CLEAR ROUTINE (FIG. 13)

The clear subroutine is entered upon power-up or on entry from one key on the keyboard. This subroutine has one subroutine, the Display Multiplex and Keyboard Scan routine, which will be outlined later. CLEAR sets the display to zero, resets the D/A converter, resets all flags, and then waits for an entry by scanning the keyboard. If a function key is pressed the five major subroutines will be entered.

C. BAKE ROUTINE (FIG. 14)

BAKE can be entered from the time or clear subroutines. Entry from CLEAR will initialize the system with the oven off and flash a zero to indicate a three-digit temperature between 185° F. to 517° F. is to be entered. If the temperature is outside these limits or an erroneous key is depressed, an error will be indicated by entry into the error routine. Upon the third digit entry, the oven will do a temperature conversion, set up the reference voltage $V_S$ through the D/A converter, and turn the oven on or off based on a signal from the temperature sensing circuitry in the oven chip. The oven will control at the programmed temperature. When the newly programmed temperature is first reached, the system will give a one-second beep to indicate the oven is preheated (has reached the programmed temperature). If this subroutine is entered from the time subroutine, it will not interrupt the oven heaters when programmed but will turn off the heaters and give an audible alarm when the timer decrements to zero. The TIMER is programmed in this routine by entering TIMER and one to three digits which are shifted on to the display as above. Five seconds are allowed to make an entry after the first and second digits before the timer starts and ignores any further entries. There is no delay after the third digit since this is the maximum number allowed. When in this TIME BAKE mode the decrementing timer is always displayed unless the BAKE key is pressed, in which case the temperature is displayed for five seconds during which time the BAKE temperature may be changed. If the temperature is changed, the first digit entry within the five seconds turns off the oven until the third digit is entered. The new temperature is entered and the oven is restarted on the third digit entry.

D. TOAST ROUTINE

(FIG. 15)

TOAST is initialized by flashing a zero until one digit is entered. When a digit is entered, it will be displayed and the corresponding TOAST code will be sent to the oven ship via the D/A converter. During the TOAST operation, all keys except CANCEL, TOAST, and Door will be ignored. CANCEL will shut down the system and reset all registers. If the door is opened, the system will go to the cancel routine as if CANCEL is pressed. While in the TOAST mode if TOAST is pressed, the system will wait five seconds for a new digit entry without interrupting power. If a new digit is entered that new TOAST color will be accepted and sent to the D/A converter without interrupting power. If no digit is entered after five seconds, the system will continue and ignore further digit entry. A toast complete cycle is detected as 'filament off' and an alarm is given while displaying the toast color programmed. The alarm is terminated and the system reset by opening the door or by depressing the CANCEL (clear). The complete toast cycle must be reprogrammed for further toasting. An error signal is given when a zero is programmed for a TOAST color.

E. TIME ROUTINE

(FIG. 16)

The time routine can be programmed separately or with BAKE or BROIL. If programmed with BAKE or BROIL, it does not interrupt the oven operation while programming but turns off the oven after the timer has decremented to zero. Parts of this routine are used for SLOW COOK. When the TIMER key is pressed, this routine is entered from CLEAR, BAKE, or BROIL by flashing a zero and waiting for a digit entry. When a digit is entered, the system will wait five seconds before starting the time for a second digit and another five seconds for a third digit if a second digit is entered. After the third digit, there is no delay since a maximum of three digits are entered. This is strictly a minute timer and will program up to 999 minutes and will display the decrementing time. The TIMER can be changed by depressing TIMER and the new digit(s). If the TIME-BAKE (or BROIL) are programmed, the BAKE temperature may be displayed for five seconds by depressing BAKE. If BROIL is pressed, "brl" will be displayed for five seconds and then revert back to the time display. If the door is opened during the TIMED BAKE, BROIL, SLOW COOK functions, the power will be removed from the heaters and the timer stopped while the door is opened. When the timer is decremented to zero, if power is applied it will be removed and an alarm will sound until the operator takes any of the following action: (1) Enters new digits to restart timer, (2) Opens door, alarm stops, system waits for door to be closed for further programming or clear, (3) Clear, reinitializes system, ready for reprogramming, and/or (4) turns power off.

F. SLOW COOK ROUTINE

(FIG. 17)

SLOW COOK is a preprogrammed function which uses the BAKE and TIME subroutines to set the oven to a high temperature of around 425° F. for approximately an hour and after the preset time lowers the oven temperature to the area of 225° F. indefinitely, for all-day cooking. The temperatures and time are preadjusted for optimum SLOW COOK performance for the oven cavity characteristics in which the controller is installed.

G. BROIL ROUTINE

(FIG. 18)

BROIL is a preprogrammed function which turns on the upper Calrod heaters only, and only turns them off if the lower sensor reaches a temperature of approximately 350° F. This is done to prevent the oil/grease from reaching its flash point. After broil is programmed the only keys that are not ignored are the Door key, CLEAR, and TIME key as described previously for the TIME-BROIL routine.

H. DISPLAY AND KEYBOARD SCAN SUBROUTINE

(FIG. 19)

The display and keyboard scan subroutine is the heart of the system which keeps track of Input and Output for the whole system. It performs major housekeeping functions through subroutines which will be outlined later. This subroutine updates and maintains the seven segment displays and LED function lamps. It also scans and debounces the keyboard and checks for three system failures. If the failures occur, corrective action is taken. Provisions are made in this routine to maintain the display with or without an alarm present. The door subroutine is a separate routine which requires special action. Whenever a key is detected a 10 msec. beep is given to acknowledge that the key is recognized. This routine also tests the SLOW COOK timing.

I. MULTIPLEX WITH ALARM SUBROUTINE

(FIG. 20)

R5 is the alarm driver pin which is driven at approximately 3 KHz for the alarm. When the alarm is sounded, the display must be maintained, since it is multiplexed; therefore, the display must be multiplexed with the alarm on signal. This routine accomplishes this while the keyboard is still scanned.

I. KEY DETECT AND RECORD SUBROUTINE

(FIG. 21)

This subroutine is used to detect and record key entries, while maintaining the alarm signal during the ½ second on cycle.

K. TIME-KEEPING, R10 FAILURE CHECK AND 60 KHz ABSENT CHECK SUBROUTINES

(FIGS. 22-24)

Figure 19:
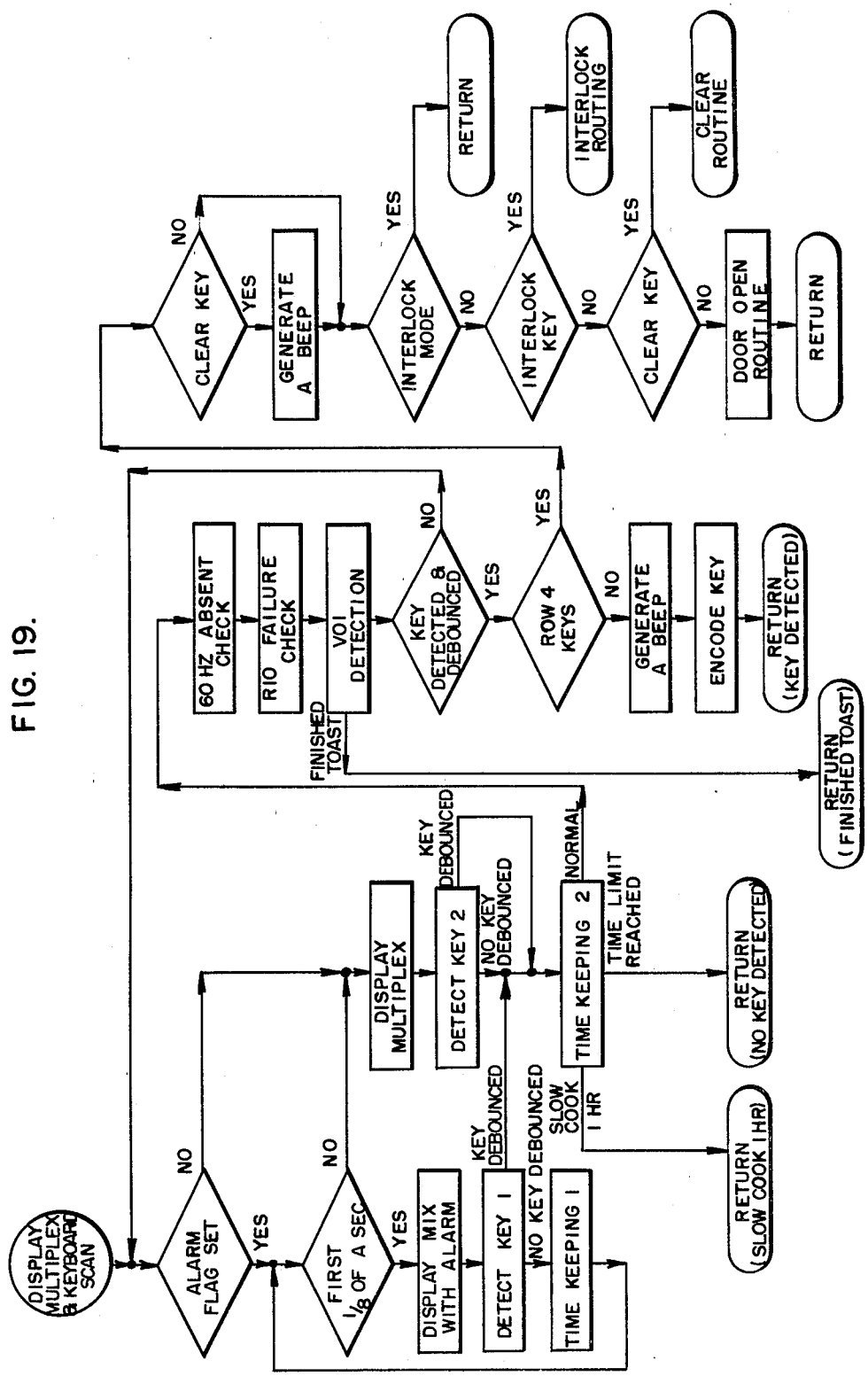
Figure 20:
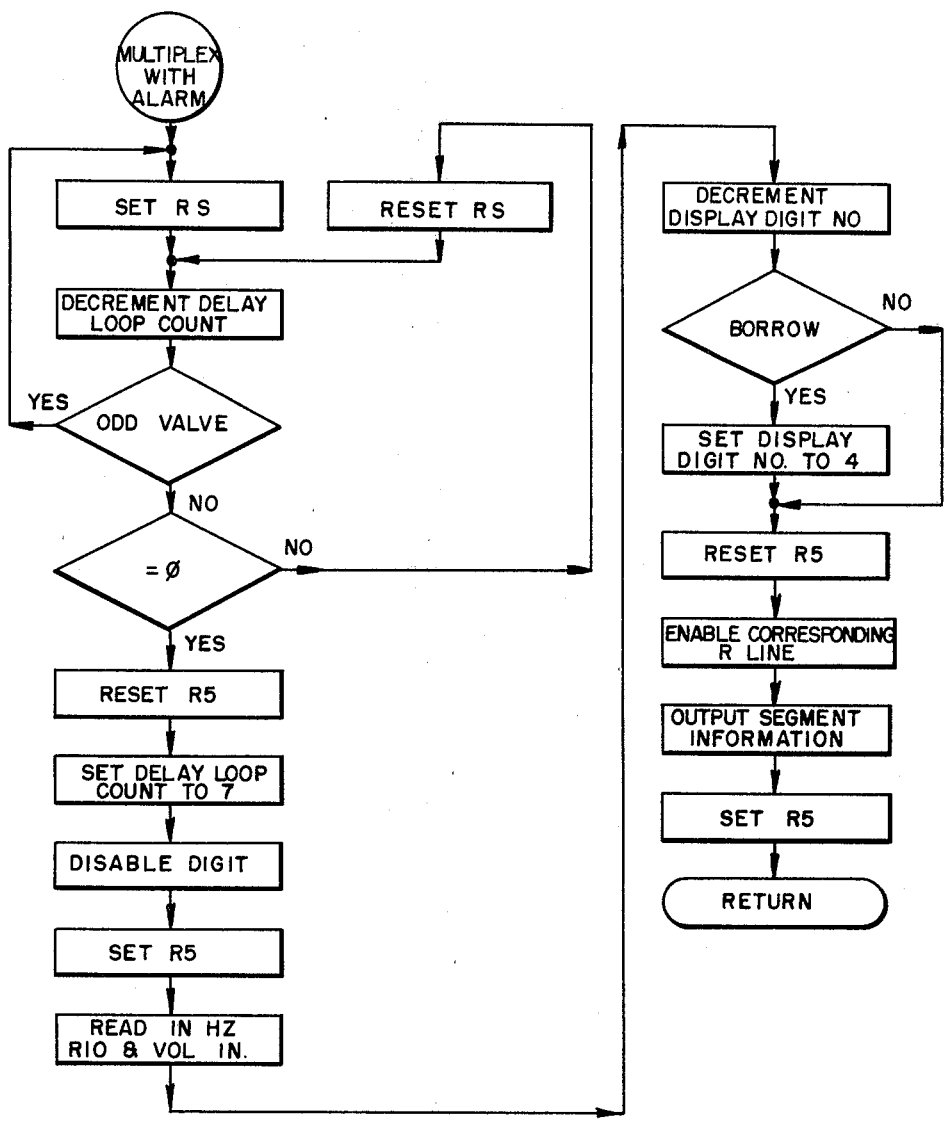
Figure 21:
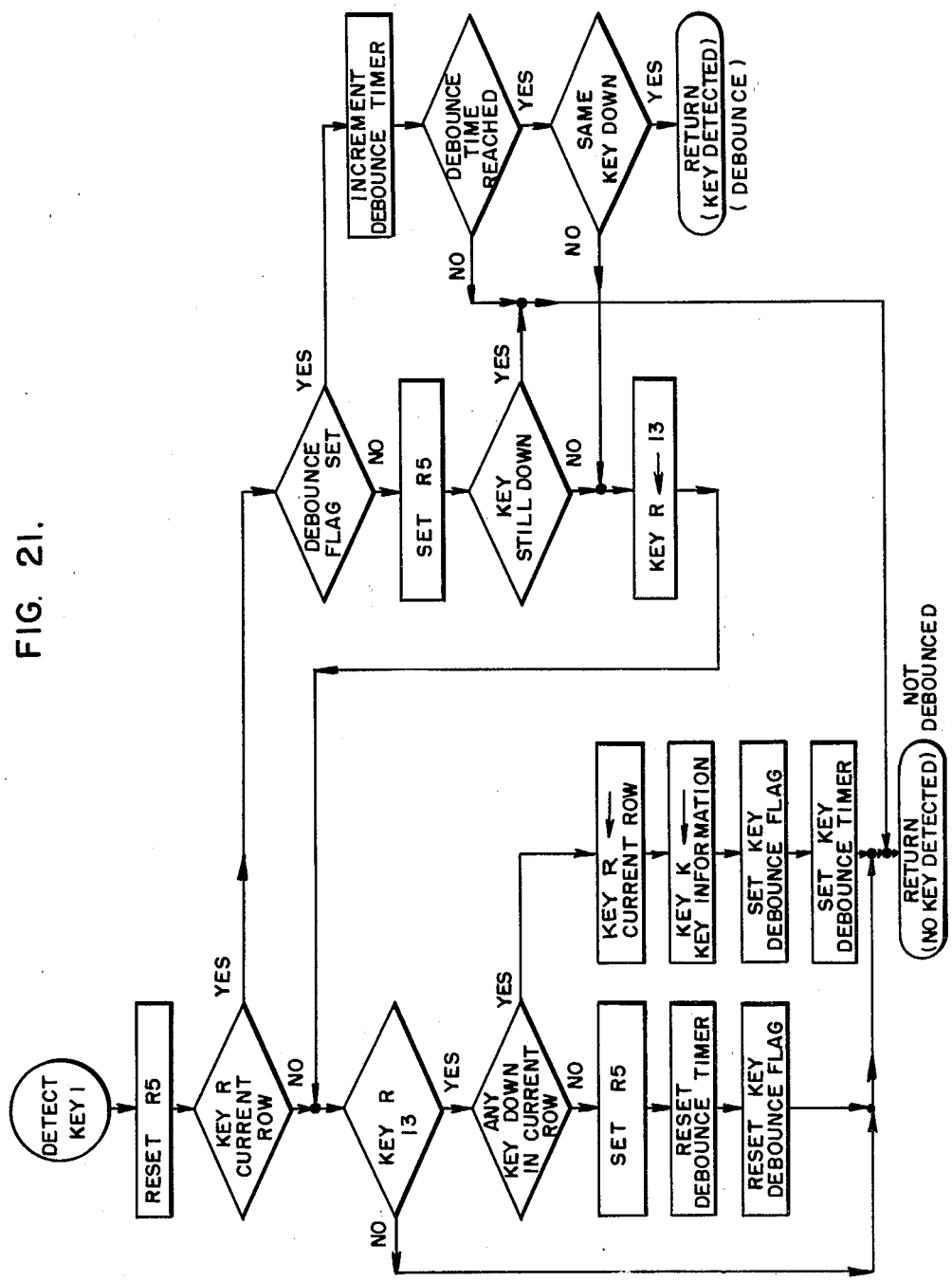

These three routines are used in the FIG. 19 routine to, first, detect the 60 Hz falling edge to decrement the least significant time divider for the timer, and second, to monitor the R10 line which drives the relays for the heaters. This line is monitored by the processor and if R10 fails high, heaters on, then the processor will determine that R10 is high when it is not supposed to be. If this occurs, the Interlock routine will be called, causing an ILL display with the alarm. This is to signal the hazard when this failure occurs. The third subroutine checks for the loss of the 60 Hz signal to the microprocessor. If 60 Hz is lost, the system will revert to an auxiliary internal timer which will maintain the relay debounce timer and other timing. In Time 3, the timer will not be programmable if 60 Hz is absent. If 60 Hz is lost during a timer cycle, the internal timer will decrement the time to zero in approximately double the time and will not allow future timer programming until the 60 Hz is restored.

L. DISPLAY MULTIPLEX SUBROUTINE (FIG. 25)

The routine Multiplexes the display and checks 60 Hz, R10, and $V_{O1}$ information alternately. One digit of the seven-segment display is updated each time through this routine.

M. TIME-KEEPING SUBROUTINE (FIG. 26)

This is the major time keep subroutine which takes information from time keeping 1 and 60 Hz absent check. It allows programming the timer by entering TIMER and then 1 to 3 digits with a five-second delay between 1-2 and 2-3 to allow the operator time to make a second and third entry. The timer is in minutes only. It can be programmed separately or with BAKE and BROIL. The remaining time is always displayed unless Bake temperature is recalled (and/or changed) for 5 seconds or BROIL is pressed which will display "brl" for 5 seconds. Both cases will revert back to decrementing time after 5 seconds. This routine also monitors timing for the SLOW COOK mode as well as the relay debounce timer. It also monitors the display flashing timer. The timer decrements to zero and alarms. It also shuts off power in TIME-BAKE or TIME-BROIL. The alarm will be terminated with a door open, CLEAR or entering new time. SLOW COOK timing is also handled in this routine. When SLOW COOK time decrements to zero, the temperature is changed to the lower temperature setting.

N. KEY DETECT AND DEBOUNCE SUBROUTINE (FIG. 27)

This key detection routine is used when the alarm 'on' signal is not present. Key debounce is also handled in this subroutine.

O. $V_{O1}$ DETECTION SUBROUTINE (FIG. 28)

$V_{O1}$ is the output of the oven integrated circuit or chip which signals the microprocessor whether the heaters should be on or off in accordance with the oven chip's internal equations comparing the D/A converter to the sensor input level. This signal is a positive going pulse of approximately 5 msec. at the zero crossing points of the $V_{AC}$ input of the custom oven chip (taken off from secondary of 60 Hz line). The heaters are turned on if these pulses are present and off if absent. If $V_{O1}$ fails high, indicating heaters on, this subroutine turns off the heaters and will not allow them to be turned on again unless $V_{O1}$ is restored to proper operation. The filament (heaters) off timer is used with the increment relay timer to make sure that the relay is on for a minimum of one second and off for a minimum of one second to eliminate relay chatter. This subroutine also controls a preheat signal which is given the first time the oven turns off in the BAKE mode. This signals the operator that the oven has reached the programmed BAKE temperature.

P. DOOR ROUTINE (FIG. 29)

The door routine is used to turn off power in the BAKE, BROIL, and SLOW COOK routines and to stop the TIMER while the door is opened. When the door is opened in the TOAST mode, the system is cleared. Opening the door also stops the alarm signal when initiated. Critical information is saved while the door is opened. The door input is part of the keyboard matrix; therefore, the display multiplex and keyboard scan routine is used to maintain the display and to monitor to see when the door is closed. No other keyboard entries can be made while the door is open except CANCEL and Interlock which both clear the system.

Q. INTERLOCK ROUTINE (FIG. 30)

Figure 24:
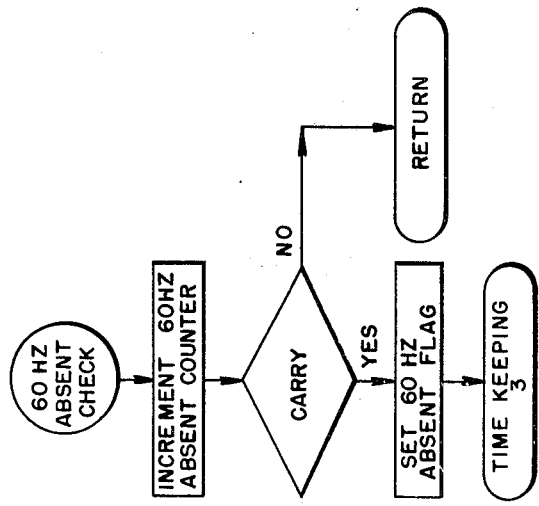
Figure 23:
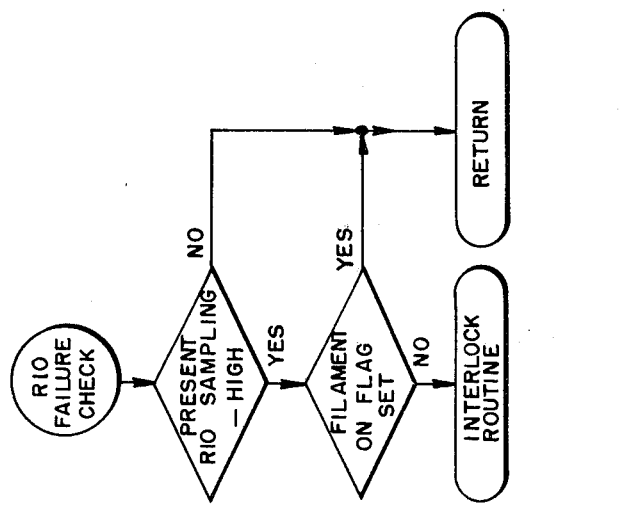
Figure 22:
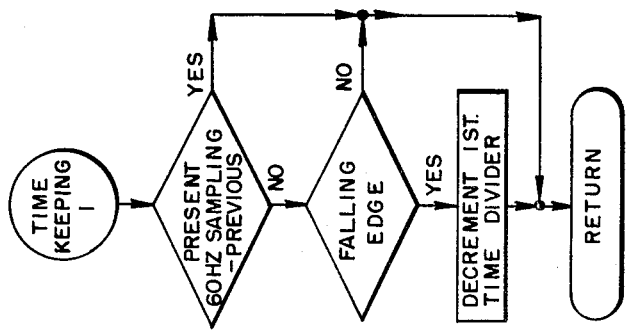
Figure 25:
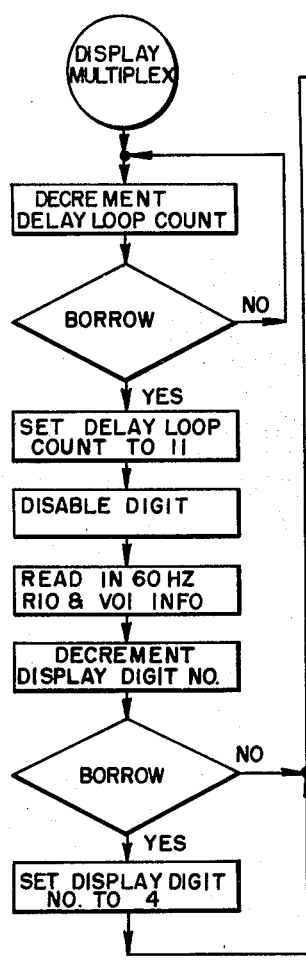
Figure 30:
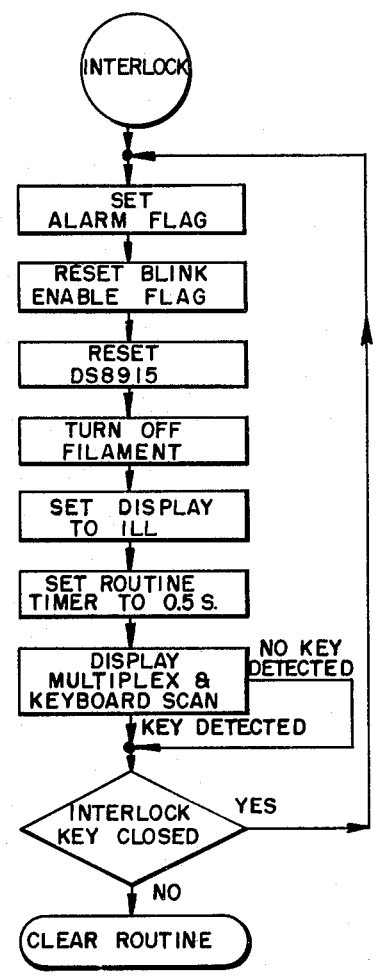
Figure 26:
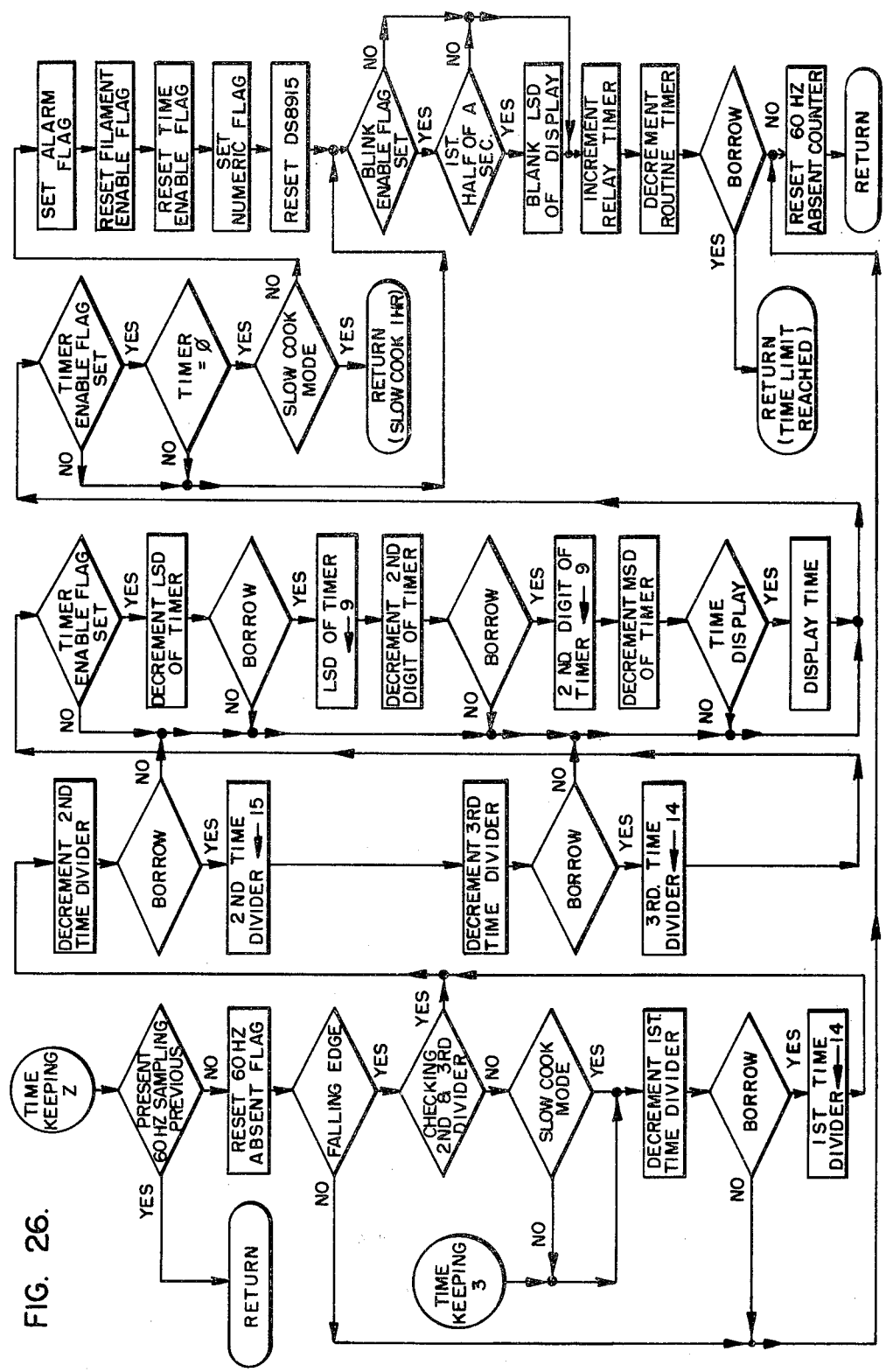
Figure 27:
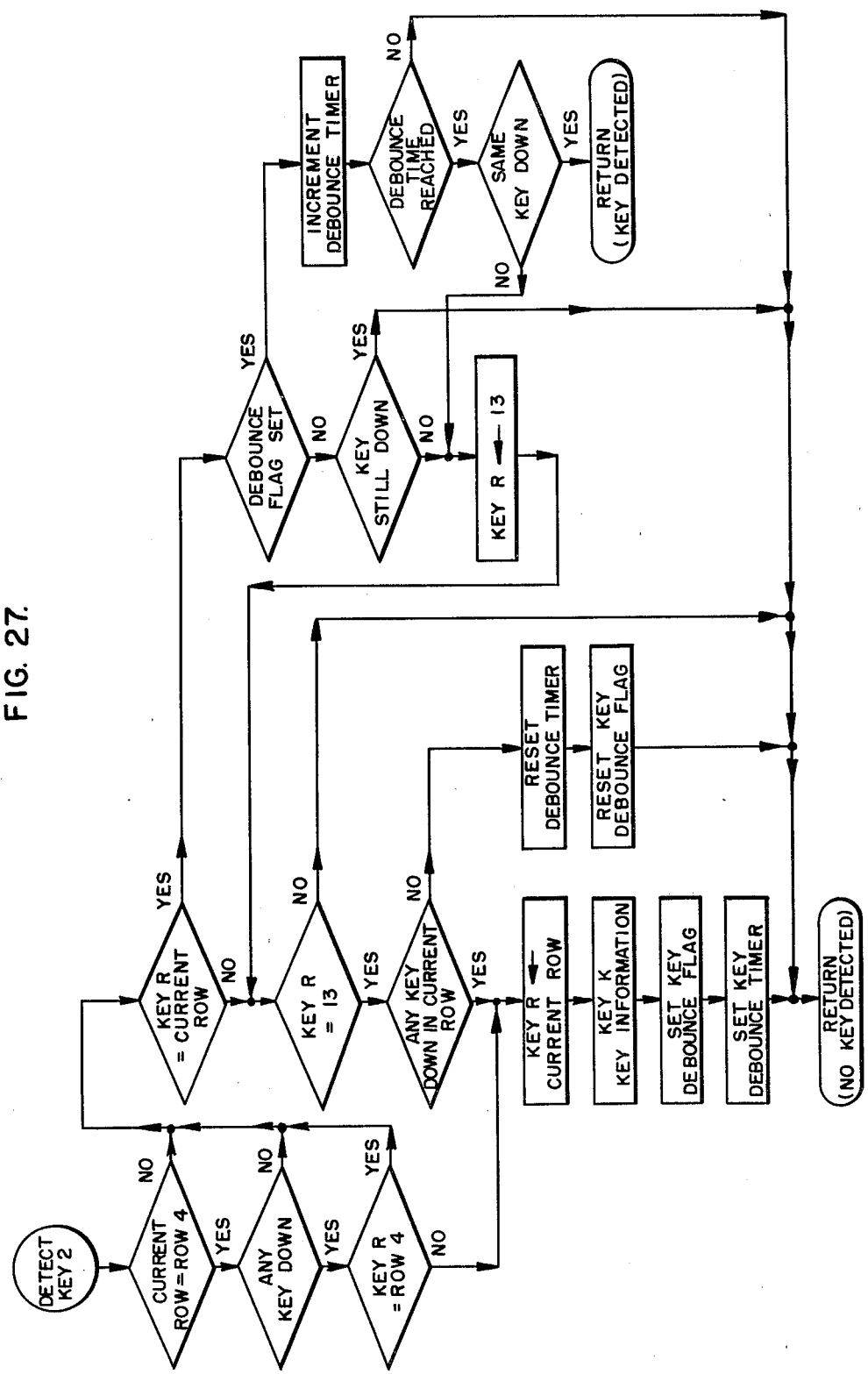
Figure 28:
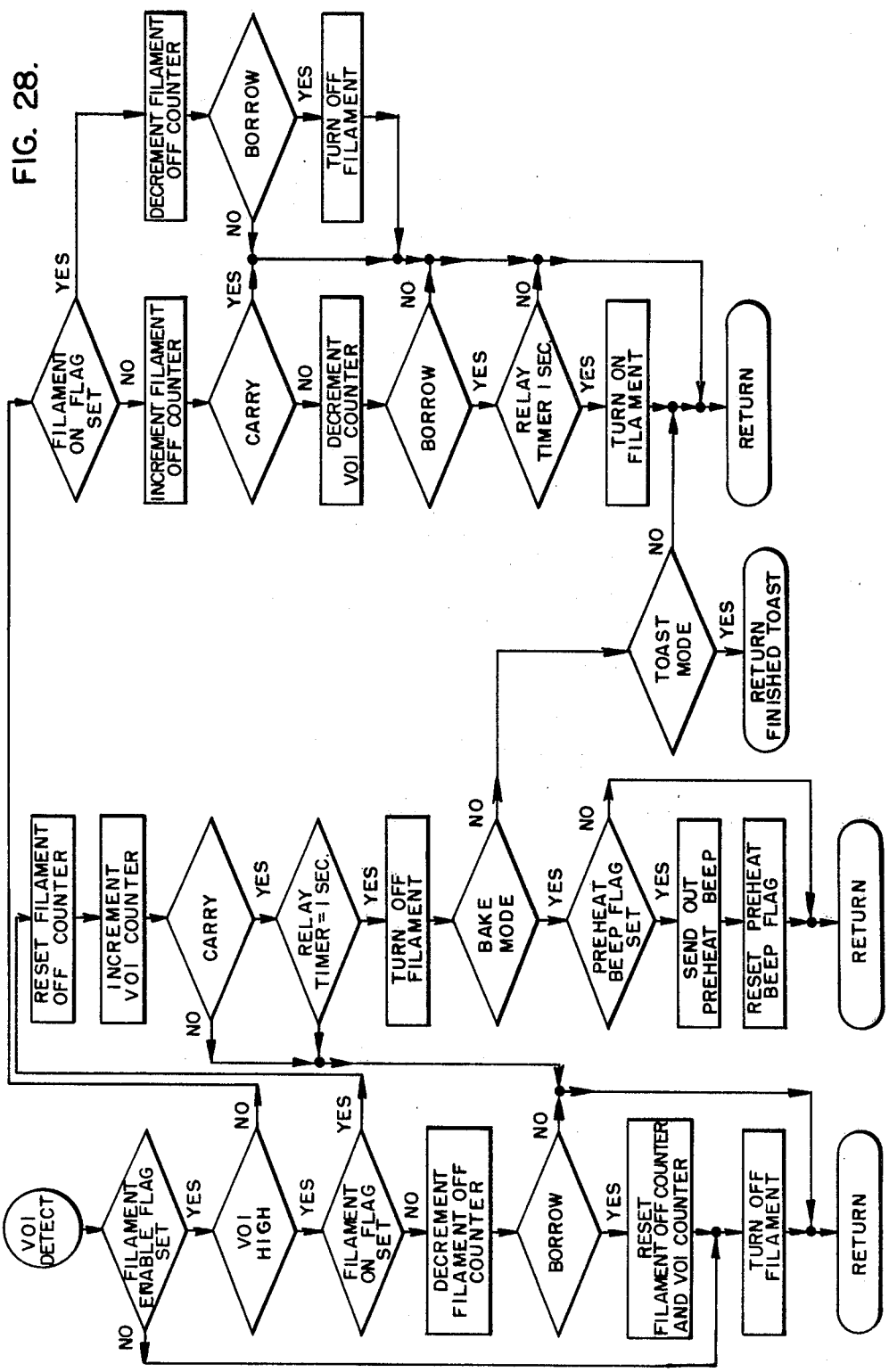
Figure 29:
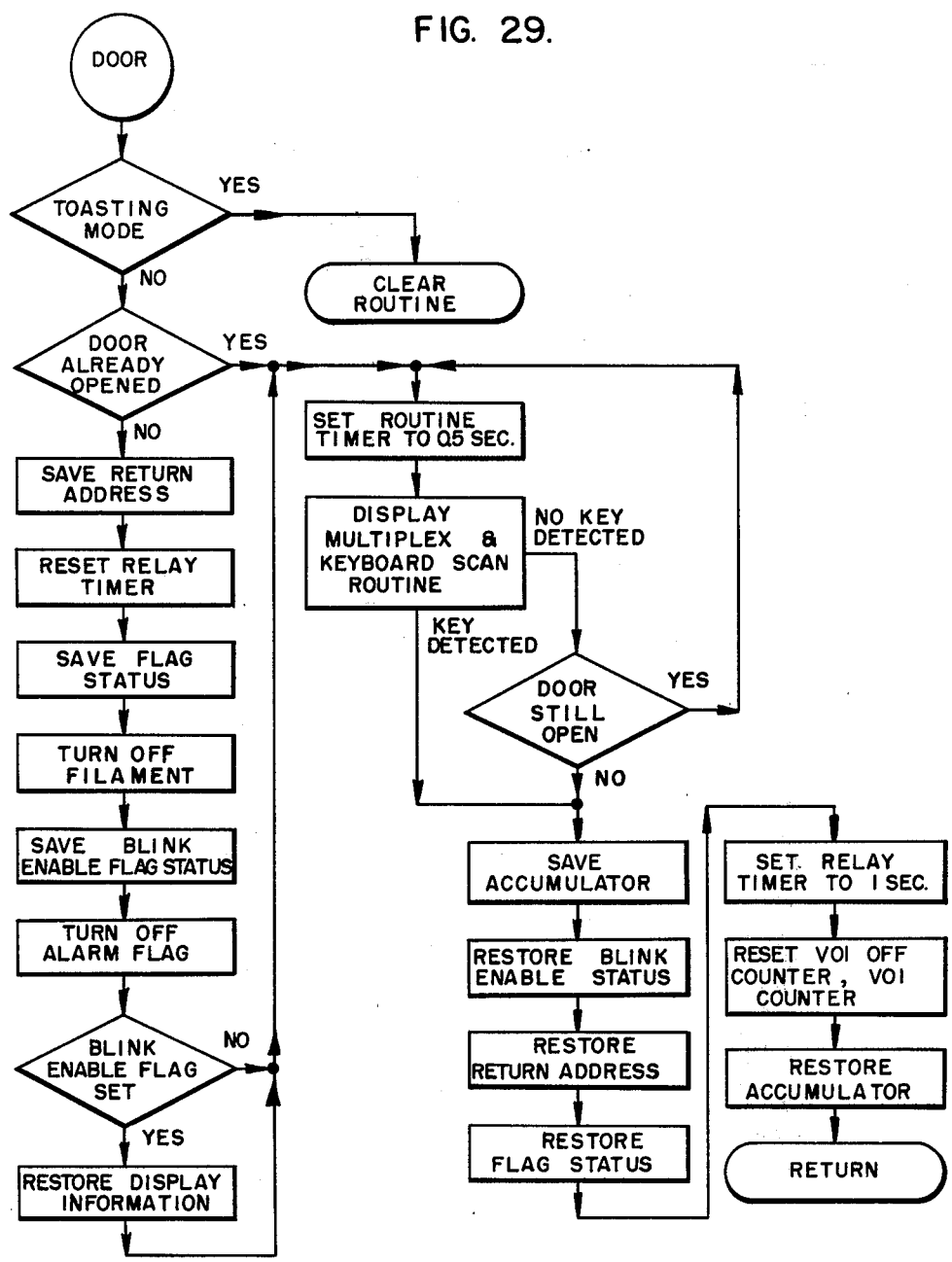

The interlock routine is used by the R10 monitor routine mentioned in relation to the flow chart shown in FIGS. 22-24 as described and is also used to monitor the placement of a removable panel in the oven, which, if removed, would present a hazard to the operator if allowed to operate in this mode (operation will proceed only if a parallel power interrupt to the heaters failsdouble failure). When this panel is not placed properly "ILL" will be displayed with an alarm. If the panel is placed back into proper position, this indication will be cleared and allow reprogramming. The "ILL" routine will clear the system when the panel is replaced or when R10 is restored to normal operation.

R. TEMPERATURE CONVERSION AND BLINK ZERO TIME CHECK SUBROUTINES (FIGS. 31 and 32)

This first routine converts three-digit bake temperatures entered from the keyboard to a digital count which is sent to the D/A converter for conversion of this digital count to a voltage reference $V_S$ for the oven chip. This routine also detects errors in temperature entry which are temperatures below 185° F. or above 517° F. If an error indication is given, it can be removed by simply entering a correct temperature. The blink zero time check routine is to blink zero at a 2 Hz rate on a function key entry to signal the operator that the system is waiting for digit entries.

Figure 33:
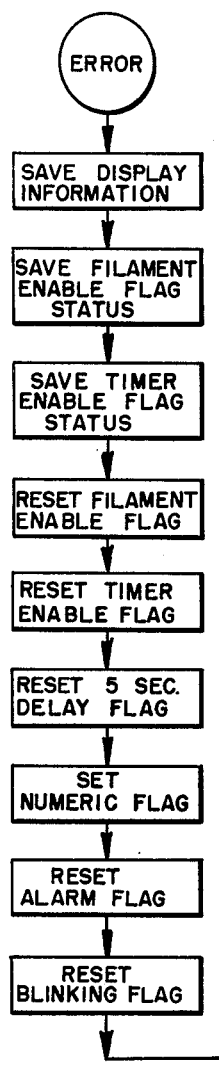
Figure 34:
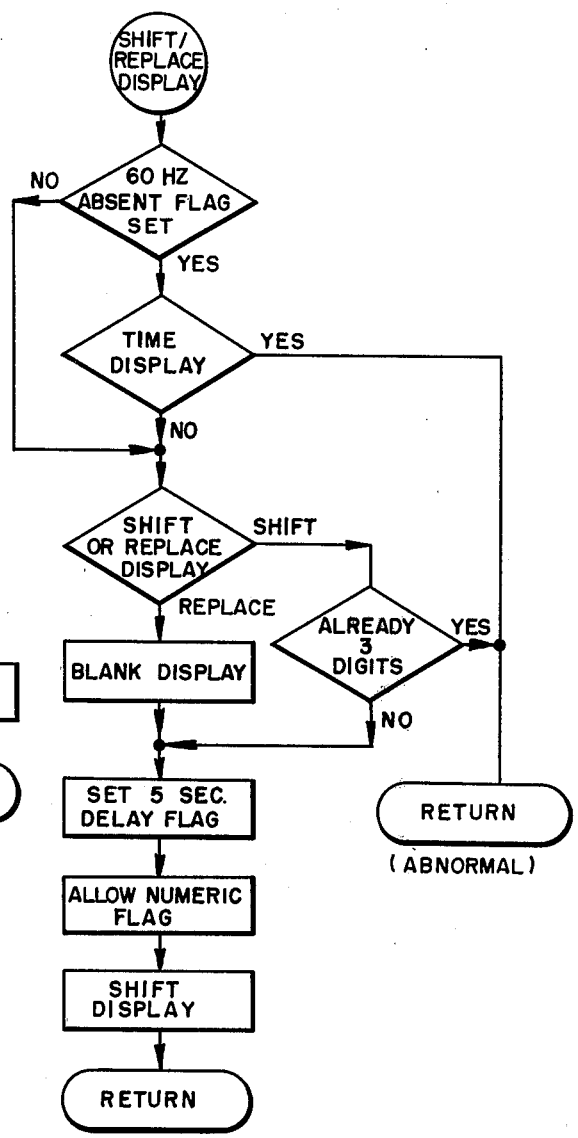

S. ERROR AND SHIFT/REPLACE DISPLAY SUBROUTINE (FIGS. 33 and 34)

The error routine will cause the display to read "Err" whenever illegal key entries are made during programming. The error routine can be reset when the proper keys are depressed or correct values are entered in BAKE or TOAST. The Shift/Replace display routine is to shift in entries one display character at a time from right to left as succeeding entries are made in entering BAKE, TOAST, or TIME digits.

While the principles of the present invention have been described with reference to presently preferred embodiments, the broader aspects of the invention are not limited to specific design features described. A person skilled in the art may modify or change the more specific features described without departing from the spirit and scope of the invention as defined in the appended claims.

APPENDIX

CTO-3000 SEQUENCE CHART
OUTPUTS FROM PROCESSOR

| MODE-KEY INPUTS | DISPLAY MSD | DISPLAY LSD | LAMPS TOAST | LAMPS BAKE | LAMPS BROIL | LAMPS TIME | MIN. | TEMP | R5 | ALARM R8 | R9 | R10 | R6 | R7 | D/A COUNTER | DOOR OPEN SWITCH | V01 | NOTES |
|---|---|---|---|---|---|---|---|---|---|---|---|---|---|---|---|---|---|---|
| Bake Function Selected | — — | Blink 0 | 0 | 1 | 0 | 0 | 0 | 1 | Beep | 0 | 0 | 0 | 0 | 1 | 0-count | Open | High | Reset 4024 counter to zero's. Turn on bake lamp |
| Select 2 | — — | 2 | 0 | 1 | 0 | 0 | 0 | 1 | Beep | 0 | 0 | 0 | 0 | 1 | 0-count | Open | High | Select digit 2 |
| Select 5 | — — | 25 | 0 | 1 | 0 | 0 | 0 | 2 | Beep | 0 | 0 | 0 | 0 | 1 | 0-count | Open | High | Select digit 5 |
| Select 0 | | 250 | 0 | 1 | 0 | 0 | 0 | 1 | Beep | 1 | 1 | 1 | 1 | 1 | 250-count | Open | ZC | Three digits selected, system loads D/A counter with proper code and starts. |
| Depresses bake key again while in bake mode | | 250 | 0 | 1 | 0 | 0 | 0 | 1 | Beep | 1 | 1 | 1 | 1 | 1 | 250-count | Open | High | Enter new temperature by depressing "BAKE" key again then enter new number. If bake was previously slected display present selection. Keep |
| After five seconds delay no entry made. Oven remains on at previous temperature | | 250 | 0 | 1 | 0 | 0 | 0 | 1 | 0 | 1 | 1 | 1 | 1 | 1 | 250-count | Open | ZC | power on and wait 5 seconds for new temperature. Five second counter is overridden if new selection is begun. CLEAR will reinitialize system. |
| Alternate: She makes new entry selects "3" | — — | 3 | 0 | 1 | 0 | 0 | 0 | 1 | Beep | 1 | 1 | 0 | 0 | 1 | 250-count | Open | High | Start new entry. System off until third digit entered |
| Selects "0" | — — | 30 | 0 | 1 | 0 | 0 | 0 | 1 | Beep | 1 | 1 | 0 | 0 | 1 | 250-count | Open | ZC | Load counter after three digits selected, oven starts at new count. All keys ignored except clear, bake, time and door open |
| Door-Open | — — | 300 | 0 | 1 | 0 | 0 | 0 | 1 | 0 | 1 | 1 | 0 | 1 | 0 | 300-count | Open | High | Door Open - Removes power from calrods until closed again. Then resumes previous function. Bake Temp - Depressing bake temp. key while in bake mode will turn system to five second delay wait mode with power on (see flow chart above) Cook Time - Depressing time key will initiate a time bake set up. Flow shown on charts next page. Clear - Will reinitialize system at this time Interlock - Interrupts power to system and displays |

APPENDIX-continued

CTO-3000 SEQUENCE CHART
OUTPUTS FROM PROCESSOR

| MODE-KEY INPUTS | DISPLAY MSD | DISPLAY LSD | LAMPS TOAST | LAMPS BAKE | LAMPS BROIL | LAMPS TIME | LAMPS MIN. | LAMPS TEMP | ALARM R5 | ALARM R8 | ALARM R9 | ALARM R10 | ALARM R6 | ALARM R7 | D/A COUNTER | DOOR OPEN SWITCH | V01 | NOTES |
|---|---|---|---|---|---|---|---|---|---|---|---|---|---|---|---|---|---|---|
| Change bake temp. system in Time Bake mode | — | 60 | 0 | 1 | 0 | 1 | 0 | 0 | 0 | 1 | 1 | 1 | 0 | 1 | 300-count | Open | ZC | "ILL". System resumes in wait mode when back door fixed. System status prior to hitting bake key. In Time Bake Mode with 60 min/300° programmed |
| Depress Bake Key | — | 300 | 0 | 1 | 0 | 1 | 0 | 1 | Beep | 1 | 1 | 1 | 0 | 1 | 300-count | Open | ZC | Depressing Bake key while in Time Bake mode, immediately displays temperature selected. Display for five seconds, if no further key entries return to time display. Minute timer inhibited |
| Depress 3 within five seconds | — | 3 | 0 | 1 | 0 | 1 | 0 | 1 | Beep | 1 | 1 | 0 | 0 | 1 | 300-count | Open | High | Enter 3, system off, override five second delay. Minute |
| Select 2 | — | 32 | 0 | 1 | 0 | 1 | 0 | 1 | Beep | 1 | 1 | 0 | 0 | 1 | 300-count | Open | High | timer inhibited after first digit entered |
| Select 5 | — | 325 | 0 | 1 | 0 | 1 | 0 | 1 | Beep | 1 | 1 | 1 | 1 | 0 | 325-count | Open | High | Reset D/A converter, enter new count, start |
| After five second delay (30 min. elapsed) | — | 60 | 0 | 1 | 0 | 1 | 1 | 0 | 0 | 1 | 1 | 1 | 1 | 0 | 325-count | Open | ZC | System continues, displays time |
| Door-open for three minutes | — | 30 | 0 | 1 | 0 | 1 | 1 | 0 | 0 | 1 | 1 | 0 | 1 | 0 | 325-count | Closed | High | Door open, shuts power off to calrods. Stops timer from counting |
| Door-closed | — | 30 | 0 | 1 | 0 | 1 | 1 | 0 | 0 | 1 | 1 | 1 | 1 | 0 | 325-count | Open | ZC | Door closed, restarts system. Timer resumes counting immediately |
| Time Complete | — | 0 | 0 | 1 | 0 | 1 | 1 | 0 | Alarm | 0 | 0 | 0 | 1 | 0 | 325-count | Open | High | Time complete-system turns off power to calrods and issues Alarm. Maintains |
| Open-door | — | 0 | 0 | 1 | 0 | 1 | 1 | 0 | 0 | 0 | 0 | 0 | 1 | 0 | 325-count | Open | High | previous bake temperature. Timer may be restarted by pressing time key followed by time selection, i.e., 30 minutes. NOTE: Timer entry of three digits requires no delay after third digit. Timer starts immediately on third digit entry. Alarm terminated by: 1. Clear key 2. Door Open |

APPENDIX-continued

CTO-3000 SEQUENCE CHART
OUTPUTS FROM PROCESSOR

| MODE-KEY INPUTS | DISPLAY MSD | DISPLAY LSD | LAMPS TOAST | LAMPS BAKE | LAMPS BROIL | LAMPS TIME | LAMPS MIN. | TEMP | ALARM $R_5$ | ALARM $R_8$ | ALARM $R_9$ | ALARM $R_{10}$ | ALARM $R_6$ | ALARM $R_7$ | D/A COUNTER | DOOR OPEN SWITCH | V01 | NOTES |
|---|---|---|---|---|---|---|---|---|---|---|---|---|---|---|---|---|---|---|
| Time Bake example system previously reset | — — | Flash | | | | | | | | | | | | | | | | 3. Depressing Bake or Time keys<br>4. Entering New Time Digit Time function can be implemented either before, after or during Bake or Broil function |
| Depress Time Key | — — | 0 | 0 | 0 | 0 | 1 | 1 | 0 | Beep | 0 | 0 | 0 | 0 | 1 | 0-count | Open | High | |
| Select 5 | — — | 5 | 0 | 0 | 0 | 1 | 1 | 0 | Beep | 0 | 0 | 0 | 0 | 1 | 0-count | Open | High | Select five minutes in the five second delay |
| Select 0 | — | 50 | 0 | 0 | 0 | 1 | 1 | 0 | Beep | 0 | 0 | 0 | 0 | 1 | 0-count | Open | High | Selection of 0 overrides five second delay, re-initiates five second delay for next digit |
| Select Bake | — — | Flash | 0 | 1 | 0 | 1 | 0 | 1 | Beep | 0 | 0 | 0 | 0 | 1 | 0-count | Open | High | |
| Select 3 | — — | 3 | 0 | 1 | 0 | 1 | 0 | 1 | Beep | 0 | 0 | 0 | 0 | 1 | 0-count | Open | High | |
| Select 0 | — — | 30 | 0 | 1 | 0 | 1 | 0 | 1 | Beep | 0 | 0 | 0 | 0 | 1 | 0-count | Open | High | |
| Select 0 | — | 300 | 0 | 1 | 0 | 1 | 0 | 1 | Beep | 1 | 1 | 1 | 1 | 0 | 300-count | Open | High | 3-digits selected. System starts |
| After Five Seconds | — | 50 | 0 | 1 | 0 | 1 | 1 | 0 | 0 | 1 | 1 | 1 | 1 | 0 | 300-count | Open | ZC | System displays time after five seconds delay. System always displays time remaining unless Bake key depressed which will display selected bake temp. For five seconds then return to time remaining display |
| Change time sequence system had been running for ten minutes) | | | | | | | | | | | | | | | | | | |
| —No key depressed - (10 minutes elapsed) | — | 40 | 0 | 1 | 0 | 1 | 1 | 0 | 0 | 1 | 1 | 1 | 1 | 0 | 300-count | Open | ZC | Bake temperature may be changed only during the five seconds delay period |
| Depress Time key | — | 40 | 0 | 1 | 0 | 1 | 1 | 0 | Beep | 1 | 1 | 1 | 1 | 0 | 300-count | Open | High | Time can be changed by merely depressing time key then enter new time |
| (Wait five seconds. IF no key entry, continue function) Depress 6 | — — | 6 | 0 | 1 | 0 | 1 | 1 | 0 | Beep | 1 | 1 | 1 | 1 | 0 | 300-count | Open | High | Change time to 60 minutes |
| Depress 0 | — | 60 | 0 | 1 | 0 | 1 | 1 | 0 | 0 | 1 | 1 | 1 | 1 | 0 | 300-count | Open | ZC | System not interrupted during reprogramming Timer starts after 5 sec. |
| Depress clear | — | 0 | 0 | 0 | 0 | 0 | 0 | 0 | 0 | 0 | 0 | 0 | 0 | 1 | 0-count | Open | High | System reinitializes |
| Broil Function selected Broil start sequence | ⌐ | L | 0 | 0 | 1 | 0 | 0 | 0 | Beep | 0 | 0 | 0 | 0 | 1 | 0-count | Open | High | Broil starts immediately with sequence shown. Responds to following keys:<br>A. Broil (continue)<br>B. Door Open (stop |

APPENDIX-continued
CTO-3000 SEQUENCE CHART
OUTPUTS FROM PROCESSOR

| MODE-KEY INPUTS | DISPLAY MSD | DISPLAY LSD | LAMPS TOAST | LAMPS BAKE | LAMPS BROIL | LAMPS TIME | MIN. | TEMP | ALARM R5 | R8 | R9 | R10 | R6 | R7 | D/A COUNTER | DOOR OPEN SWITCH | V01 | NOTES |
|---|---|---|---|---|---|---|---|---|---|---|---|---|---|---|---|---|---|---|
| Door Open | b r | L | 0 | 0 | 1 | 0 | 0 | 0 | 0 | 0 | 0 | 0 | 1 | 0 | Broil count | Open | High | C. Time (program time) until door closed) D. Clear (reinitializes system) Broil waits for door closed |
| -Max Broil Temp. | b r | L | 0 | 0 | 1 | 0 | 0 | 0 | 0 | 0 | 0 | etc. 0 | 1 | 0 | Broil count | Open | High | Max. broil temp. exceeded V01 goes high system shuts down power to cal-rod. |
| Time selected | — — | Flash 0 | 0 | 0 | 0 | 1 | 1 | 0 | Beeps | 0 | 0 | 0 | 1 | 0 | Undisturbed | Open | High | Time selection Flash display to show next |
| Select 3 | — — | 3 | 0 | 0 | 0 | 1 | 1 | 0 | Beeps | 0 | 0 | 0 | 1 | 0 | Undisturbed | Open | High | entry from numerical keys turns on time lamp. Time selection allowed between 1 and 240 min. all other selections result in "Err" |
| Wait 5 secs. If no key depressed begin time. Select 0 | — | 30 | 0 | 0 | 0 | 1 | 1 | 0 | Beep | 0 | 0 | 0 | 1 | 0 | Undisturbed | Open | High | Selection of "0" overrides 5-sec. delay. |
| Wait 5 secs. if no key depressed begin time. Start | — | 30 | 0 | 0 | 0 | 1 | 1 | 0 | Beep | X | X | X | 1 | 0 | Undisturbed | Resumes previous state | | Timer starts up in whatever mode was previously selected. Restore R8, R9, R10, i.e. time bake, time broil, time only. Depressing time key while system is in Bake or broil mode will immediately suspend operation until time start. After three digits entered in timer, no relay before start. |
| Time-Broil example Broil selected first. System previously cleared. Select Broil | b r | L | 0 | 0 | 1 | 0 | 0 | 0 | Beep | 1 | 0 | 1 | 1 | 0 | 0-count | Open | High | Select broil-Broil starts |
| Select Time | — — | Blink 0 | 0 | 0 | 1 | 1 | 1 | 0 | Beep | 1 | 0 | 1 | 1 | 0 | Broil-count | Open | High | Time selected, system maintains Broil count and turns power off. |
| Delay five secs if no time | | | | | | | | | | | | | | | | | | |

APPENDIX-continued
CTO-3000 SEQUENCE CHART
OUTPUTS FROM PROCESSOR

| MODE-KEY INPUTS | DISPLAY MSD | DISPLAY LSD | LAMPS TOAST | LAMPS BAKE | LAMPS BROIL | LAMPS TIME | LAMPS MIN. | TEMP | ALARM R5 | R8 | R9 | R10 | R6 | R7 | D/A COUNTER | DOOR OPEN SWITCH | V01 | NOTES |
|---|---|---|---|---|---|---|---|---|---|---|---|---|---|---|---|---|---|---|
| selected revert to untimed broil | | | | | | | | | | | | | | | | | | |
| Select 4 Within 5 secs. | — — — | 4 | 0 | 0 | 1 | 1 | 1 | 0 | Beep | 1 | 0 | 1 | 1 | 0 | Broil-count | Open | High | |
| Select 5 | — — — | 4 5 | 0 | 0 | 1 | 1 | 1 | 0 | Beep | 1 | 0 | 1 | 1 | 0 | Broil-count | Open | High | System continues..at 5 seconds Timer begins counting down and is displayed |
| After 5-secs. | — — — | 4 5 | 0 | 0 | 1 | 1 | 1 | 0 | 0 | 1 | 0 | 1 | 1 | 0 | Broil-count | Open | ZC | |
| Depress Broil Key | b r L | | 0 | 0 | 1 | 1 | 0 | 0 | Beep | 1 | 0 | 1 | 1 | 0 | Broil-count | Open | ZC | Depressing Broil key displays bro for five seconds then returns to display of time remaining. |
| Select Slow Cook | 5 L O | | 0 | 0 | 0 | 0 | 0 | 0 | Beep | 1 | 1 | 1 | 1 | 0 | Count for 425° F. | Open | ZC | Hold this temp. for 60 minutes |
| After 60 minutes | 5 L O | | 0 | 0 | 0 | 0 | 0 | 0 | 0 | 1 | 1 | 1 | 1 | 0 | Load count for 225° F. | Open | ZC | Hold temp. indefinitely Load 225° F. count |
| Error Codes Time-Toast | E r r | | 0 | 0 | 0 | Remains same as before error | | 0 | 0 | 0 | 0 | 0 | 0 | 1 | 0-count | Open | High | Output coding for error messages. |
| Interlock indication | ILL | | 0 | 0 | 0 | 0 | 0 | 0 | Alarm | 0 | 0 | 0 | 0 | 1 | 0-count | Open | High | When the interlock switch interrupts power R8 is shorted to K2 on the keyboard matrix. The display should flash "ILL" to indicate an adjustment must be made to back panel or that the back panel is missing. |
| 'TOAST' | — — — 0 | Blink | 1 | 0 | 0 | 0 | 0 | 0 | Beep | 0 | 0 | 0 | 1 | 1 | 0 | open | high | User selects toast feature System lights toast function light and blinks the least significant 'zero' on display |
| '6' | — — — 6 | | 1 | 0 | 0 | 0 | 0 | 0 | Beep | 0 | 1 | 1 | 1 | 1 | See Table 6-count | open | ZC | Upon digit entry, system starts immediately after toast count is entered. |
| TOAST COMPLETE | — — — 6 | | 1 | 0 | 0 | 0 | 0 | 0 | Alarm | 0 | 1 | 0 | 1 | 1 | 6-count | open | high | Heaters off, alarm sounds, alarm will be terminated with door open or clear. |
| DOOR OPEN | — — — 0 | | 0 | 0 | 0 | 0 | 0 | 0 | 0 | 0 | 0 | 0 | 0 | 0 | 0 | open | high | Door open reinitiates system |

APPENDIX-continued
CTO-3000 SEQUENCE CHART
OUTPUTS FROM PROCESSOR

| MODE-KEY INPUTS | DISPLAY MSD | LSD | TOAST | LAMPS BAKE | BROIL | TIME | MIN. | TEMP | R5 | ALARM R8 | R9 | R10 | R6 | R7 | D/A COUNTER | DOOR OPEN SWITCH | V01 | NOTES |
|---|---|---|---|---|---|---|---|---|---|---|---|---|---|---|---|---|---|---|
| 'TOAST' | —— 0 | Blink | 1 | 0 | 0 | 0 | 0 | 0 | Beep | 0 | 0 | 0 | 0 | 1 | 0 | open | high | After door open TOAST must be reprogrammed to continue with next load in oven. |
| '4' | —— 4 | | 1 | 0 | 0 | 0 | 0 | 0 | Beep | 0 | 1 | 1 | 1 | 1 | 4-count | open | ZC | System starts |
| 'TOAST' | —— 4 | | 1 | 0 | 0 | 0 | 0 | 0 | Beep | 0 | 1 | 1 | 1 | 1 | 4-count | open | ZC | Allow 5 seconds for new TOAST color entry. Power or Toast function not interrupted. |
| '6' | —— 6 | | 1 | 0 | 0 | 0 | 0 | 0 | Beep | 0 | 1 | 1 | 1 | 1 | 6-count | open | ZC | Do not interrupt power only add new count and continue. If no entry, continue as programmed. |
| — | —— 6 | | 1 | 0 | 0 | 0 | 0 | 0 | 0 | 0 | 1 | 1 | 1 | 1 | 6-count | open | ZC | Toast may go to completion w/o interruption |
| DOOR OPEN | —— 0 | | 0 | 0 | 0 | 0 | 0 | 0 | 0 | 0 | 0 | 0 | 0 | 0 | 0 | open | high | Open door during function will clear system. A cancel or door open at any time during toast programming or function will clear the system to power up. Initialization. All other keys except interlock will be ignored during toast programming or operation. Trying to enter a zero toast code will result in an 'Err' indication. Depressing a correct digit from 1 to 9 will correct 'Err' or cancel/door open will allow reprogramming to correct error. |

What is claimed is:

1. A countertop toaster oven appliance capable of performing the functions of TOAST, BAKE and BROIL, comprising:
    (a) a compartment in which the food items to be heated are placed;
    (b) heating elements for heating said compartment;
    (c) sensing means for sensing the temperature within said compartment externally to the food items to be heated;
    (d) a keyboard having a plurality of user actuatable keys including a plurality of numeric and function entry keys for entering numerical and functional data and for selecting one of a plurality of modes of operation;
    (e) display means for displaying numerical and functional operating data;
    (f) heater control means for controlling said heating elements;
    (g) function selection means connected to said keyboard for establishing a set of control parameters for each selected mode of operation;
    (h) heat requirement-determining means connected to said sensing means and to said function selection means for determining the heat input requirements into said compartment to satisfy the predetermined relationships for each selected mode of operation and for controlling said heater control means as a function of the actual temperature in said compartment and the temperature and mode of operation selected on said keyboard; and
    (i) an interactive data entry means connected to said function selection means and to said display means for activating said display means with a signal indicating the type of numerical data to be entered before said numerical data is entered and displaying the numerical data as it is entered.

2. A toaster oven appliance as defined in claim 1, wherein said keyboard and function selection means comprise digital circuitry, said heat requirement-determining means and said sensing elements and said heater control means comprise analog circuitry; and further comprising digital-to-analog converter means for converting at least some of said control parameters which are in the nature of digital signals to analog signals applied to said heat requirement-determining means.

3. A toaster oven appliance as defined in claim 1, wherein said sensing means comprises upper and lower sensors; and further comprising sensor select means connected to said function selection means for monitoring one of said sensors as a function of the selected mode of operation.

4. A toaster oven appliance as defined in claim 1, further comprising timer means for providing a timer function and for providing TIME BAKE and TIME BROIL modes of operation.

5. A toaster oven appliance as defined in claim 1, further comprising keyboard error detection means for monitoring said keyboard data entries and applying an error signal on said display means when improper data entries are made.

6. A toaster oven appliance as defined in claim 1, further comprising keyboard input verification means for monitoring said keyboard data entries and discounting false and incomplete entries and providing a debounce circuit means.

7. A toaster oven appliance as defined in claim 1, further comprising audible signal producing means for generating an audible signal in response to the occurrence of at least one of a predetermined number of conditions in the toaster oven appliance.

8. A toaster oven appliance as defined in claim 1, further comprising corrective means for modifying the operation of the toaster oven appliance upon the occurrence of predetermined signals at a plurality of circuit monitoring points.

9. A toaster oven appliance as defined in claim 8, wherein said corrective means comprises alarm means for producing an audible alarm when abnormal operation is detected by said corrective means.

10. A user programmable control system for a countertop toaster oven appliance capable of performing the functions of TOAST, BAKE and BROIL, comprising:
    (a) a compartment in which the food items to be heated are placed;
    (b) heating elements for heating the toaster oven appliance;
    (c) sensing means for sensing the temperature within the toaster oven appliance externally to the food items to be heated;
    (d) a keyboard having a plurality of user actuatable keys including a plurality of number and function entry keys for entering numerical and functional data and for selecting one of a plurality of modes of operation;
    (e) electronic display means for displaying numerical and functional operating data;
    (f) programmed processor means responsive to said keyboard and to said sensing means for controlling said heating elements to heat said compartment as a function of the user-selected mode of operation and for applying selected data to said electronic display means; and
    (g) an interactive data entry means connected to said keyboard and said electronic display means for activating said electronic display means with a signal indicating the type of numerical data to be entered before said numerical data is entered and displaying the numerical data as it is entered.

11. A control system as defined in claim 10, wherein said sensing means includes upper and lower sensing elements within said toaster oven appliance; and further comprising sensing element select circuit means controlled by said programmed processor means for selecting one of said sensing means as a function of the user selected mode of operation.

12. A control system as defined in claim 11, wherein said sensing element select circuit means comprises a sense line to which one of said sensing elements is to be coupled, and switch means for selectively coupling one of said sensing elements to said sense line.

13. A control system as defined in claim 12, wherein said switch means comprises first and second bilateral switches for said sensing element, the input terminal of each bilateral switch being connected to the associated sensing element and the output terminals of said bilateral switches being connected to said sense line, and enable means connected to said programmed processor means and directly to the gate of said upper sensing element and through inverter means to the gate of said lower sensing means, said programmed processor means causing said enabling means to turn on the bilateral switch for said upper sensing element only in the BAKE mode of operation.

14. A control system as defined in claim 13, wherein said programmed processor means generates two "1"

level signals at two of its outputs only in the BAKE mode of operation, said enable means comprising two series-connected third and fourth bilateral switches having the gates thereof connected to said outputs of said programmed processor means, said input to said third and fourth bilateral switches being connected to a source of voltage and the output of said third and fourth bilateral switch for said upper sensing element and through inverter means to the gate of said bilateral switch for said lower sensing element.

15. A control system as defined in claim 10, wherein said programmed processor means is programmed to generate heating elements actuating signals only when required by temperature conditions within the toaster oven appliance for a selected mode of operation, said sensing means including at least one sensing element for sensing the temperature within the toaster oven appliance and generating a first control voltage V sense; and further comprising conversion means for converting data from said programmed processor means which is a function of user selected inputs into a second control voltage $V_s$; a predetermined transfer function means for each mode of operation for providing a third control voltage $V_o$ which is a function of said first control voltage Vsense and the selected mode of operation; and comparator means for comparing said second and third control voltages and generating an enable voltage $V_{ol}$ to said programmed processor means for generating said heating elements actuating signals only when said third control voltage $V_o$ is below said second control voltage $V_s$.

16. A control system as defined in claim 15, wherein said programmed processor means is programmed to generate operating mode select signals as a function of use selected inputs, and further comprising function select circuit means responsive to said operating mode select signals for selecting one of said predetermined transfer function means for comparing the respective third control voltage $V_o$ thereof in said comparator means.

17. A control system as defined in claim 16, wherein one of the available modes of operation is BAKE, and the BAKE transfer function means generates a third control voltage $V_o$ equal to:

$$V_o = 8.333 \, (V_{sense} - 0.195 \, V_{sh})$$

where $V_{sh}$ is a high reference voltage.

18. A control system as defined in claim 16, wherein one of the available modes of operation is BROIL, and the BROIL transfer function means generates a third control voltage $V_o$ equal to:

$$V_o = 10.94 \, (V_{sense} - 0.15 \, V_{sh})$$

where $V_{sh}$ is a high reference voltage.

19. A control system as defined in claim 16, wherein one of the available modes of operation is TOAST, and further comprising integrating means for integrating said first control voltage $V_{sense}$ to generate a fourth control voltage $V_D$, and the TOAST transfer function means generates a third control voltage $V_o$ equal to:

$$V_o = 22.59 \, (V_{sense} - 0.5126 \, V_D - 0.124 \, V_{sh})$$

where $V_{sh}$ is a high reference voltage.

20. A control system as defined in claim 15, wherein said programmed processor means is programmed to generate heating elements actuating signals only upon detection of zero-crossing pulses, and further comprising a zero-crossing generator for generating zero-crossing pulses $V_{ol}$ only when third control voltage $V_{ol}$ is below said second control voltage $V_s$.

21. A control system as defined in claim 15, wherein said first, second and third control voltages are analog voltages, said conversion means comprising a digital-to-analog converter for converting digital data from said programmed processor means to said second control analog signal $V_s$.

22. A control system as defined in claim 21, wherein said digital-to-analog converter comprises an n-bit storage counter having an input connected to said programmed processor means, and an n-bit ladder resistor network coupled to said n-bit storage counter and having an output at which said second control voltage $V_s$ is provided, said programmed processor means being programmed to include a count table which defines the digital-to-analog load number for each selected temperature, whereby for each selected temperature a predetermined binary count is loaded into said n-bit storage counter to thereby provide the required second control voltage $V_s$ at said output of said ladder network.

23. A control system as defined in claim 22, wherein said digital-to-analog converter comprises a seven bit serial-in and parallel-out storage counter and a seven bit resistor ladder network.

24. A control system as defined in claim 10, wherein said programmed processor means is programmed to effect modifications in the operation of the toaster oven appliance upon the occurrence of predetermined signals at a plurality of circuit monitoring points, said programmed processor means having a plurality of inputs connected to both said keyboards and to said circuit monitoring points for deriving electrical signals therefrom and buffer means for isolating said circuit monitoring points from said keyboard and selectively applying only one set of electrical signals in a given time to said plurality of inputs of said programmed processor means.

25. A control system as defined in claim 10, further comprising audible signal producing means connected to and actuatable by said programmed processor means for generating an audible signal on at least one of a predetermined number of conditions in the toaster oven appliance.

26. A control system as defined in claim 10, wherein said programmed processor means is programmed to detect erroneous data entries at said keyboard and to cause an error indication to be displayed on said display means.

27. A control system as defined in claim 10, wherein said programmed processor means is programmed to receive up to a predetermined number of data entries in a selected mode of operation and to provide a substantially fixed delay after each data entry in which a next subsequent data entry may be accepted in the absence of which no further data entries can be made.

28. A control system as defined in claim 10 or 25, wherein said programmed processor means is programmed to monitor a plurality of predetermined control signals during operation and to turn off said heating elements whenever the same are on and abnormal operation is detected by a change in at least one of said control signals.

* * * * *